(12) United States Patent
Zhang et al.

(10) Patent No.: US 11,537,166 B2
(45) Date of Patent: Dec. 27, 2022

(54) FLEXIBLE DISPLAY MODULE COMPRISING HEAT DISSIPATION ASSEMBLY AND DISPLAY DEVICE THEREOF

(71) Applicant: Hubei Yangtze Industrial Innovation Center Of Advanced Display Co., Ltd., Wuhan (CN)

(72) Inventors: Xiaoyin Zhang, Shanghai (CN); Donghua Chen, Shanghai (CN)

(73) Assignee: Hubei Yangtze Industrial Innovation Center Of Advanced Display Co., Ltd., Wuhan (CN)

( * ) Notice: Subject to any disclaimer, the term of this patent is extended or adjusted under 35 U.S.C. 154(b) by 46 days.

(21) Appl. No.: 17/202,513

(22) Filed: Mar. 16, 2021

(65) Prior Publication Data
US 2022/0187873 A1  Jun. 16, 2022

(30) Foreign Application Priority Data
Dec. 16, 2020  (CN) .......................... 202011485566.X

(51) Int. Cl.
*G06F 1/16* (2006.01)
*G06F 1/20* (2006.01)

(52) U.S. Cl.
CPC .......... *G06F 1/1652* (2013.01); *G06F 1/1681* (2013.01); *G06F 1/206* (2013.01)

(58) Field of Classification Search
CPC combination set(s) only.
See application file for complete search history.

(56) References Cited

U.S. PATENT DOCUMENTS 10,433,462 B2 * 10/2019 Yoon .................. H05K 7/20336
10,928,855 B2 * 2/2021 Knoppert ................ G06F 1/206
2020/0409436 A1 * 12/2020 Watanabe ............. G06F 1/1698

FOREIGN PATENT DOCUMENTS

CN      104347003 A    2/2015
CN      210574775 U    5/2020

* cited by examiner

*Primary Examiner* — Lisa Lea-Edmonds
(74) *Attorney, Agent, or Firm* — Anova Law Group, PLLC

(57) ABSTRACT

A flexible display module and a display device are provided. The flexible display module includes a flexible display panel; and a heat dissipation assembly. The heat dissipation assembly includes a fan assembly and a first air tube; the first air tube is disposed on at least one side edge of the flexible display panel; and the fan assembly provides an airflow to a surface of the flexible display panel through the first air tube.

20 Claims, 16 Drawing Sheets

FLEXIBLE DISPLAY MODULE COMPRISING HEAT DISSIPATION ASSEMBLY AND DISPLAY DEVICE THEREOF

CROSS-REFERENCE TO RELATED APPLICATION

This application claims the priority of Chinese Patent Application No. 202011485566.X, filed on Dec. 16, 2020, the content of which is incorporated by reference in its entirety.

TECHNICAL FIELD

The present disclosure generally relates to the field of display technology and, more particularly, relates to a flexible display module and a display device.

BACKGROUND

From the cathode ray tube (CRT) era to the liquid crystal display (LCD) era, and the organic light-emitting diode (OLED) era, the display industry has experienced decades of development and has become rapidly changing. The display industry has been closely related to our lives, from traditional mobile phones, tablets, TVs and PCs, to the current electronic devices, such as smart wearable devices and VR, the display technology is inseparable.

With the development of display technology, electronic products are increasingly moving towards the design structures of light, thin and short. Therefore, new materials and assembly technologies are constantly being introduced. Flexible displays are one of the examples. In the related technologies, a heat dissipation structure is usually provided at the bottom of the flexible display for the heat dissipation. Such a heat dissipation method cannot take into account the heat dissipation requirements of the flexible screen. Thus, the heat dissipation effect may be not as desired, and the user experience may be affected. The disclosed flexible display modules and display devices are directed to solve one or more problems set forth above and other problems in the art.

SUMMARY

One aspect of the present disclosure provides a flexible display module. The flexible display module may include a flexible display panel; and a heat dissipation assembly. The heat dissipation assembly includes a fan assembly and a first air tube; the first air tube is disposed on at least one side edge of the flexible display panel; and the fan assembly provides an airflow to a surface of the flexible display panel through the first air tube.

Another aspect of the present disclosure provides a display device. The display device may include a flexible display module. The flexible display panel may include a flexible display panel; and a heat dissipation assembly. The heat dissipation assembly includes a fan assembly and a first air tube; the first air tube is disposed on at least one side edge of the flexible display panel; and the fan assembly provides an airflow to a surface of the flexible display panel through the first air tube.

Other aspects of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Figure 1:
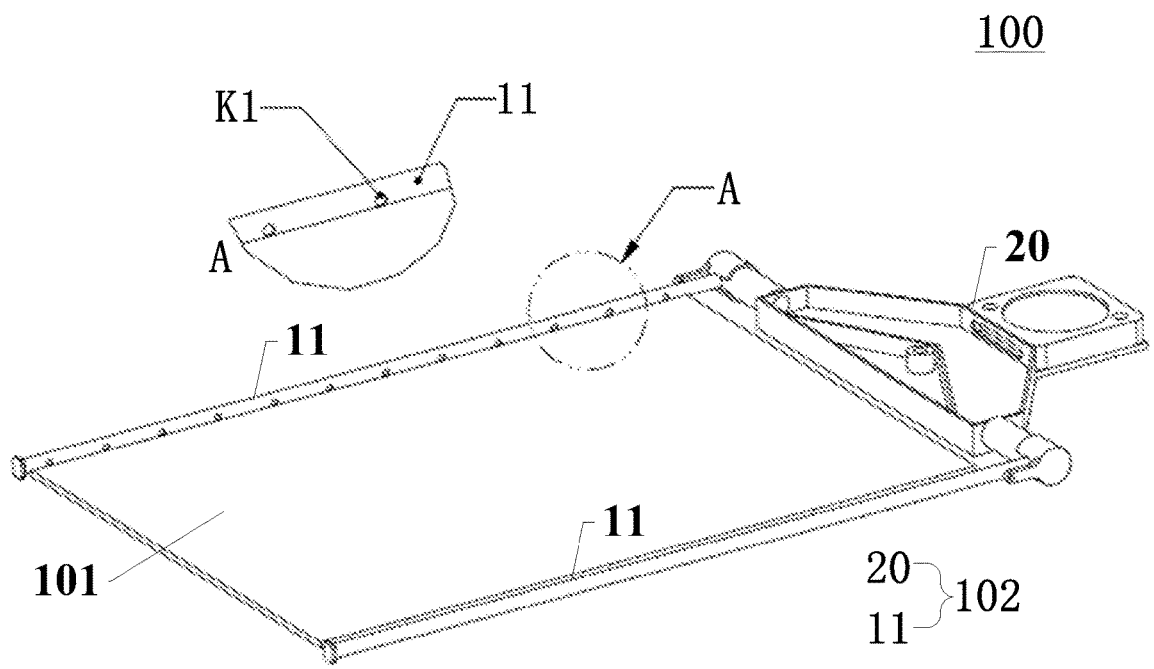
FIG. 1 illustrates an exemplary flexible display module consistent with various disclosed embodiments of the present disclosure.

Various exemplary embodiments of the present disclosure will now be described in detail with reference to the accompanying drawings. It should be noted that unless specifically stated otherwise, the relative arrangement of components and steps, numerical expressions and numerical values set forth in these embodiments do not limit the scope of the present invention.

The following description of at least one exemplary embodiment is actually only illustrative, and in no way serves as any limitation to the present disclosure and its application or use.

The technologies, methods, and equipment known to those of ordinary skill in the relevant fields may not be discussed in detail, but where appropriate, the technologies, methods, and equipment should be regarded as part of the specification.

In all examples shown and discussed herein, any specific value should be interpreted as merely exemplary, rather than as a limitation. Thus, other examples of the exemplary embodiments may have different values.

It should be noted that similar reference numerals and letters indicate similar items in the following drawings, so once an item is defined in one drawing, it does not need to be further discussed in the subsequent drawings.

Figure 2:
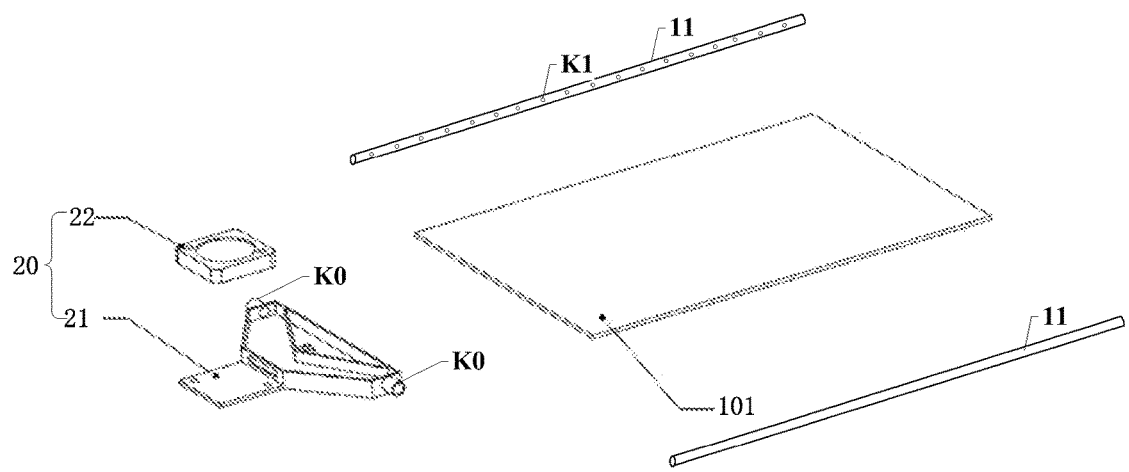
FIG. 2 illustrates an explosion view of the flexible display module in FIG. 1.

The present disclosure provides a flexible display module. FIG. 1 is a schematic structural diagram of an exemplary flexible display module consistent with various disclosed embodiments of the present disclosure. FIG. 2 is an exploded view of the flexible display module in FIG. 1.

As shown in FIGS. 1-2, the flexible display module 100 may include a flexible display panel 101 and a heat dissipation assembly 102. The heat dissipation assembly 102 may include a fan assembly 20 and a first air tube 11. The first air tube 11 may be disposed on at least one side edge of the display panel 101. The fan assembly 20 may provide an airflow to the surface of the flexible display panel 101 through the first air tube 11.

It should be noted that the embodiment of FIGS. 1-2 only illustrate the relative positional relationship between the flexible display panel 101 and the heat dissipation assembly 102, and do not represent the actual size. Further, the flexible display panel 101 in the present disclosure may be, for example, an organic electroluminescence display panel, or an inorganic light-emitting diode (OLED) display panel, etc. The present disclosure does not limit the specific structure of the flexible display panel 101. The flexible display panels that are able to realize the bending function and can be used for displaying pictures are all applicable to the present disclosure.

For example, referring to FIGS. 1-2, the flexible display module 100 provided by the present disclosure may include a flexible display panel 101 and a heat dissipation assembly 102 for dissipating heat for the flexible display panel 101. The heat dissipation assembly 102 may include the fan assembly 20 and the first air tube 11. The first air tube 11 may be disposed on at least one side edge of the flexible display panel 101. The fan assembly 20 may be used to provide an airflow required for cooling the flexible display panel 101. The first air tube 11 may be used to provide the airflow generated by the fan assembly 20 to the surface of the flexible display panel 101. In one embodiment, the first air tube 11 may be disposed on one side edge of the flexible display panel 101 to realize the function of heat dissipation for the flexible display panel 101. The embodiment shown in FIGS. 1-2 shows a situation in which the first air tube 11 is disposed on the two side edges of the flexible display panel 101. When the heat dissipation is performed on the flexible display panel 101, the airflow may pass through the first air tube 11 from the two side edges of the flexible display panel 101 and flow to the surface of the flexible display panel 101 to realize the cooling function to the entire surface of the flexible display panel 101. Accordingly, the area of the heat dissipation to the flexible display panel 101 may be increased, the heat dissipation efficiency may be increased. Further, the abnormal display of the flexible display panel 101 caused by the heat accumulation in certain areas of the flexible display panel 101 may be avoided. Thus, the display reliability of the flexible display module 100 and the user experience may be enhanced.

In one embodiment, the flexible display panel 101 may include a first surface and a second surface disposed oppositely to each other. The first surface may be, for example, the light-exiting surface of the flexible display panel 101. In the flexible display module 100 provided by the present disclosure, the heat dissipation assembly 102 may provide the airflow to only one of the first surface and the second surface to dissipate heat for the flexible display panel 101 through one of the two surfaces. In some other embodiments of the present disclosure, the heat dissipation assembly 102 may also provide the airflow to the first surface and the second surface at the same time such that the first surface and the second surface are simultaneously dissipated. Accordingly, the heat dissipation efficiency may be improved.

In one embodiment, in the flexible display module 100, when the first air tube 11 is fixed to one or two side edges of the flexible display panel 101, the fan assembly 20 may be fixed to the other side edge adjacent to the above-mentioned side edge (s). For example, the side edge where the fixed first air tube 11 is fixed may be adjacent to the side edge where the fan assembly 20 is fixed. Referring to FIG. 1 and FIG. 2, in such a configuration, the fan assembly 20 may provide the airflow to the nearby air outlet. The embodiment shown in FIGS. 1-2 shows a situation in which the first air tube 11 is disposed on two opposite side edges of the flexible display panel 101, and the side edge provided with the fan assembly 20 may be adjacent both the two side edges provided with the first air tube 11. When the flexible display panel 101 needs to be dissipated, the fan assembly 20 may provide the heat dissipation airflow to the surface of the flexible display panel 101 through the two first air tubes 11. Using the configuration that provides the airflow from both sides may improve the heat dissipation efficiency and the heat dissipation effect.

In the present disclosure, when the first air tube is disposed on at least one side edge of the flexible display panel, the first air tube may be bent according to the bending of the flexible display panel. For example, the first air tube may behave in the same manner as the flexible display panel for the operations, such as bending or folding. The configuration that the first air tube is disposed on at least one side edge of the flexible display panel to dissipate heat may meet the heat dissipation requirements of the flexible display panel in the bent or folded state. Thus, the heat dissipation of the flexible display panel in different usage states (flattened state, bending state and folded state) may be enhanced.

In another embodiment, referring to FIG. 1 and FIG. 2, the fan assembly 20 may include a fan 22 and a main air outlet K0. The first air tube 11 may include a plurality of sub-air outlets K1. The airflow provided by the fan 22 may flow to the first air tube 11 through the main air outlet K0, and may be transmitted to the flexible display panel 101 through the sub-air outlets K1 of the first air tube 11.

For example, the fan assembly 20 of the present disclosure may include the fan 22 and the main air outlet K0. The airflow generated by the fan 22 may flow out from the main air outlet K0. The main air outlet K0 may be connected to the first air tube 11 such that the airflow provided by the fan 22 may flow to the first air tube 11 through the main air outlet K0. At the same time, the first air tube 11 may be provided with a plurality of sub-air outlets K1 facing the flexible display panel 101, and the airflow in the first air tube 11 may flow to the surface of the flexible display panel 101 through the sub-air outlets K1 to realize the heat dissipation of the flexible display panel 101. In one embodiment, the sub-air outlets K1 provided on the first air tube 11 may be evenly distributed on the first air tube 11. For example, the distance between any two adjacent sub-air outlets K1 on the same first air tube 11 may be set to be approximately equal such that a more uniform airflow may be provided to the surface of the flexible display panel 101 to achieve a more uniform heat dissipation to different areas of the flexible display panel 101.

In one embodiment, the first air tube 11 provided by the embodiment of the present disclosure may be fixed on the at least one side edge of the flexible display panel 101 with a glue. To conduct the airflow in the first air tube 11 to the surface of the flexible display panel 101, branch pipes facing the flexible display panel 101 may be provided at each sub-air outlet of the first air tube 11. The branch pipes may be used to realize the transmission of the airflow to the flexible display panel 101.

In some other embodiments of the present disclosure, the first air tube 11 may also be fixed to the side edge of the flexible display panel 101 by means of a fixing member. The method of fixing the first air tube 11 by a fixing member will be described below.

Figure 3:
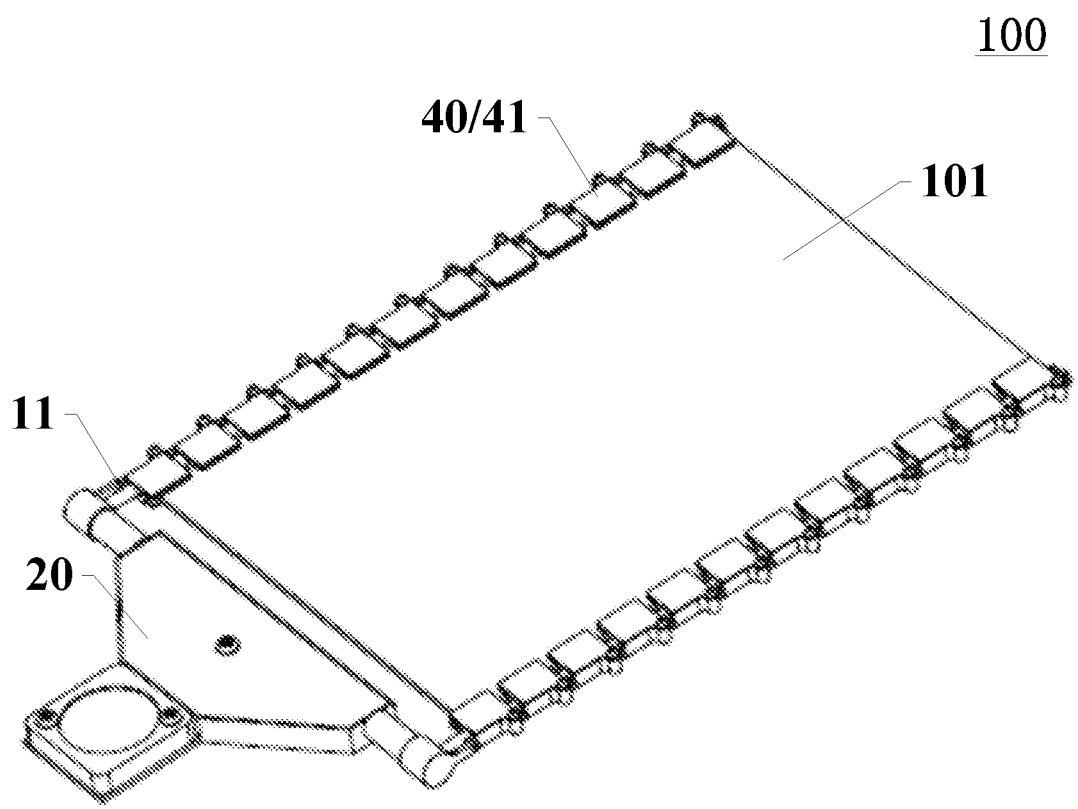
FIG. 3 illustrates another exemplary flexible display module consistent with various disclosed embodiments of the present disclosure.
Figure 4:
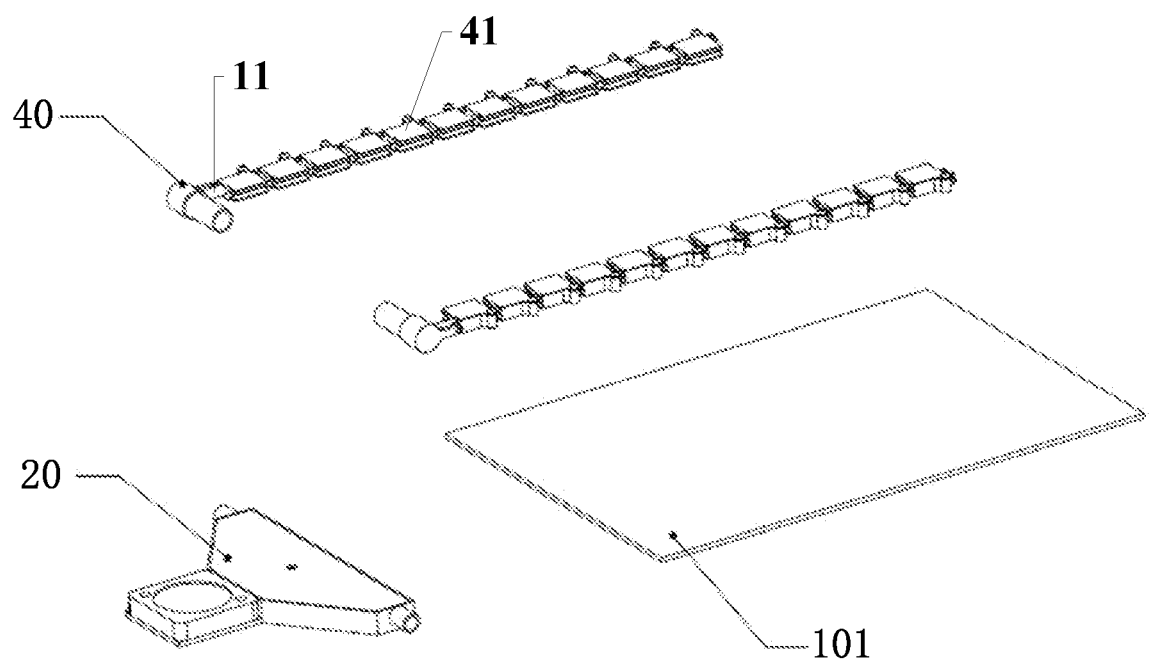
FIG. 4 illustrates an explosion view of the flexible display module in FIG. 3.

FIG. 3 is a schematic diagram of another exemplary flexible display module 100 consistent with various disclosed embodiments of the present disclosure. FIG. 4 is an exploded view of the flexible display module 100 in FIG. 3. As shown in FIG. 3-4, the flexible display module 100 may further include a fixing member 40. The fixing member 40 may be fixed to at least one side edge of the flexible display panel 101, and the first air tube 11 may be fixed by the fixing member 40.

For example, the present disclosure may introduce a fixing member 40 into the flexible display module 100. The fixing member 40 may be fixed to one side edge of the flexible display module 100. At the same time, the fixing member 40 may be used to fix the first air tube 11. When the fan assembly 20 provides airflow to the first air tube 11, the impulse of the airflow may act on the first air tube 11. If the first air tube 11 is not firmly fixed, it may move under the impulse of the airflow, and the heat dissipation effect of the flexible display panel 101 may be reduced. The present disclosure introduces the fixing member 40 to fix the first air tube 11, the phenomenon that the first air tube 11 moves under the impulse of the airflow may be avoided, and the heat dissipation stability of the flexible display module 100 may be improved.

Figure 5:
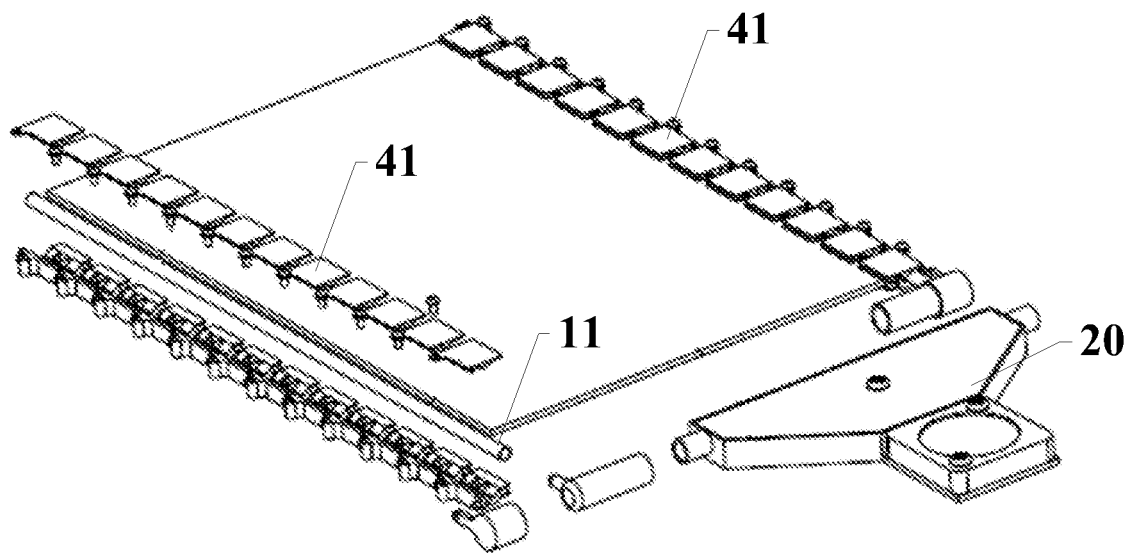
FIG. 5 illustrates a relative positional relationship between a hinge unit and a first wind tube consistent with various disclosed embodiments of the present disclosure.
Figure 6:
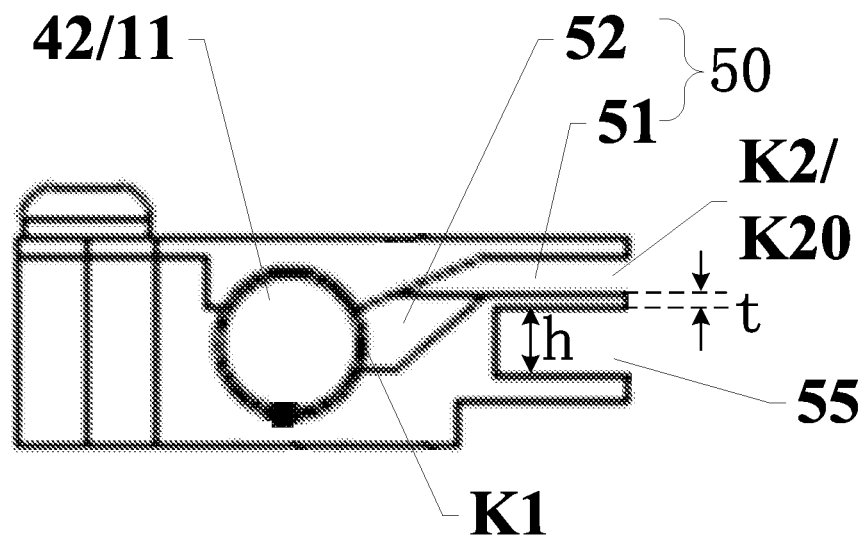
FIG. 6 illustrates a cross-sectional view a hinge unit consistent with various disclosed embodiments of the present disclosure.

In some embodiments, the fixing member 40 may include a plurality of hinge units 41. FIG. 5 illustrates a relative positional relationship between the hinge units 41 and the first air tube 11 consistent with various disclosed embodiments of the present disclosure. FIG. 6 illustrates a cross-sectional view of a hinge unit 41. As shown in FIGS. 5-6, the fixing member 40 may include a plurality of hinge units 41 connected to each other. The plurality of hinge units 41 may form a hollow host space 42, and the first air tube 11 may be disposed in the host space 42.

For example, the fixing member 40 of the present disclosure may be formed by using a plurality of hinge units 41. The plurality of hinge units 41 may be connected to each other. The first air tube 11 may be disposed in the host space 42 formed by the plurality of hinge units 41. Each hinge unit 41 may include a hollow cavity, and the hollow cavities of the plurality of hinge units 41 may form the host space 42 mentioned in the present disclosure for placing and fixing the first air tube 11. When the first air tube 11 is placed in the host space 42, the inner wall of the host space 42 may be in contact with the outer wall of the first air tube 11. In one embodiment, the inner diameter of the host space 42 may be substantially equal to the outer diameter of the first air tube 11. When the airflow generated by the fan flows into the first air tube 11, and the impulse of the airflow may act on the first air tube 11, the inner wall of the host space 42 formed by the hinge units 41 may effectively enhance the impact resistance of the first air tube 11, the phenomenon that the first air tube 11 moves under the action of the airflow impulse may be avoided.

Figure 7:
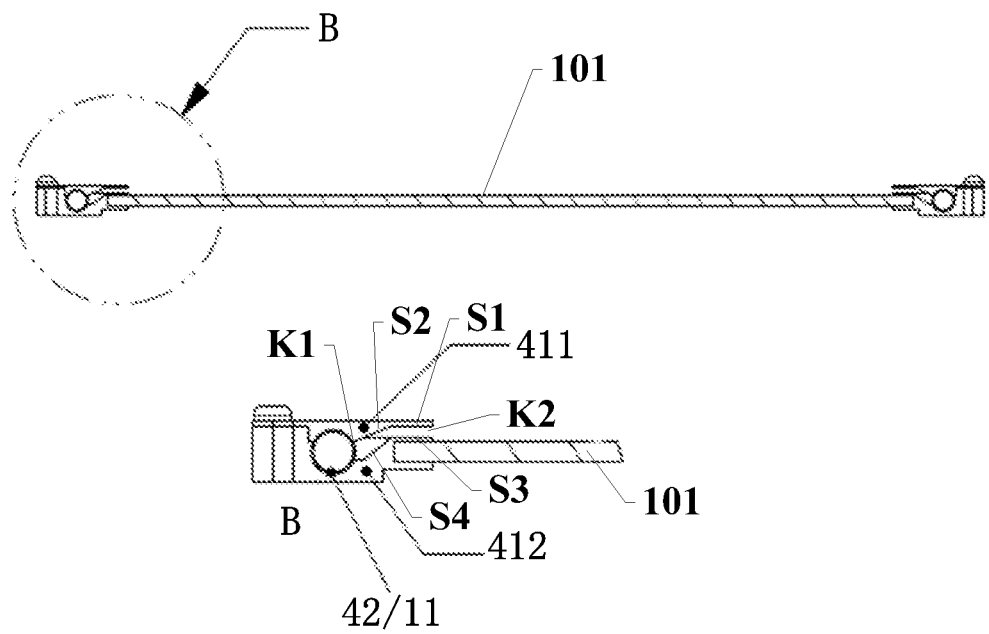
FIG. 7 illustrates a side view of an exemplary flexible display module consistent with various disclosed embodiments of the present disclosure.

FIG. 7 shows a side view of an exemplary flexible display module 100 consistent with various disclosed embodiments of the present disclosure. FIG. 7 shows the relative positional relationship of the hinge units 41, the first air tube 11, and the flexible display panel 101. The plurality of hinge units 41 may include an opening K2 facing the flexible display panel 101. The airflow may pass through the sub-air outlet K1 and then may flow to the surface of the flexible display panel 101 through the opening K2.

For example, in the flexible display module 100 provided by the embodiment of the present disclosure, after the first air tube 11 is fixed in the host space 42 formed by the hinge units 41, the sub-air outlets K1 of the first air tube 11 may be set toward the flexible display panel 101. At the same time, the hinge unit 41 may also include an opening K2 facing the flexible display panel 101. The opening K2 may have a through connection with the sub-air outlet K1 of the first air tube 11. When the airflow formed by the fan flows into the first air tube 11, the airflow may sequentially pass through the sub-air outlets K1 of the first air tube 11 and the openings K2 of the hinge units 41 and then may flow to the surface of the flexible display panel 101; and the heat dissipation function of the flexible display panel 101 may be realized.

Figure 8:
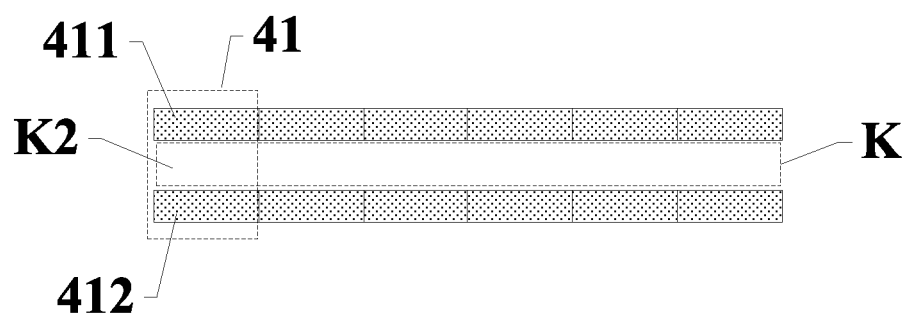
FIG. 8 illustrates an exemplary structure in which the opening on the plurality of hinge units is a through-structure consistent with various disclosed embodiments of the present disclosure.

In one embodiment, the opening K2 provided on each hinge unit 41 in the present disclosure may penetrate each hinge unit 41 along the arrangement direction of the hinge unit 41. At this time, in the viewing angle shown in FIG. 7, the opening K2 of each hinge unit 41 may have a through connection with each other. FIG. 8 shows the configuration when the openings K2 on the plurality of hinge units 41 have the through connection. FIG. 8 is the view of openings K2 of the hinge units 41 from the flexible display panel 101 to the hinge units 41 from the perspective of FIG. 3. As shown in FIG. 8, the opening K2 corresponding to each hinge unit 41 may form an opening K with a larger area facing the flexible display panel 101. When the heat dissipation is required, referring to FIG. 7, the airflow generated by the fan may flow to the surface of the flexible display panel 101 through the sub-air outlets K1 on the first air duct 11 and the above-mentioned larger area opening K2 in turn to take away the heat from the surface of the flexible display panel 101, and the cooling and heat dissipation effect on the flexible display panel 101 may be realized.

It can be understood that, in addition to the opening K2 corresponding to the multiple hinge units 41 being embodied in the form shown in FIG. 8 to form an opening K with a larger area, two or more openings formed by connecting the hinge units 41 with the through-connection may also be formed. For example, a portion (i.e., a certain number) of the openings K2 corresponding to the hinge units 41 may be through-openings that penetrate the hinge units 41, and a portion of the openings K2 of the hinge units 41 may be closed openings that may not penetrate the hinge units 41. These openings may all be able to realize to guide the airflow generated by the fan.

Figure 9:
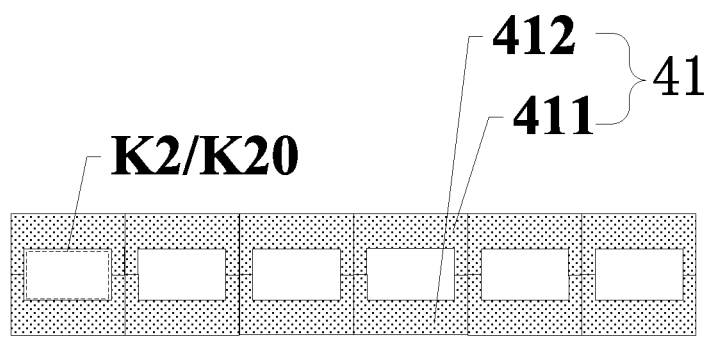
FIG. 9 illustrates an exemplary structure in which the opening on the plurality of hinge units is a close opening consistent with various disclosed embodiments of the present disclosure.

FIG. 9 shows a configuration when all the openings K2 on the plurality of hinge units 41 are closed opening K2. FIG. 9 is view of the openings K2 of hinge units 41 from the flexible display panel 101 to the hinge units 41 from the perspective of FIG. 3. As shown in FIG. 9, the openings K2 may include a plurality of sub-openings K20, and the sub-openings K20 and the sub-air outlets K1 may be arranged in a one-to-one correspondence.

FIG. 9 shows a configuration where the openings K2 on each hinge unit 41 are all closed openings K2. At this time, referring to FIG. 7, the number of the sub-air outlets K1 in the first air duct 11 located on the same side edge of the flexible display panel 101 may have a one-on-one correspondence of the number of the openings K2 on the hinge units 41 and their positions may also have a one-on-one correspondence to each other. For example, in the area defined by the hinge units 41, the sub-air outlets K1 of the first air tube 11 and the sub-openings K20 of the hinge units 41 may be correspondingly disposed, and the airflow from the sub-air outlets K1 of the first air tube 11 may flow to the flexible display panel 101 through the corresponding sub-openings K20. The openings K2 may be designed in the form of multiple sub-openings K20. The multiple sub-openings K20 may guide the direction of the airflow, which may facilitate to accurately guide the airflow formed by the fan to different areas of the flexible display panel 101. Accordingly, the heat dissipation effect of the flexible display panel 101 may be improved.

Figure 10:
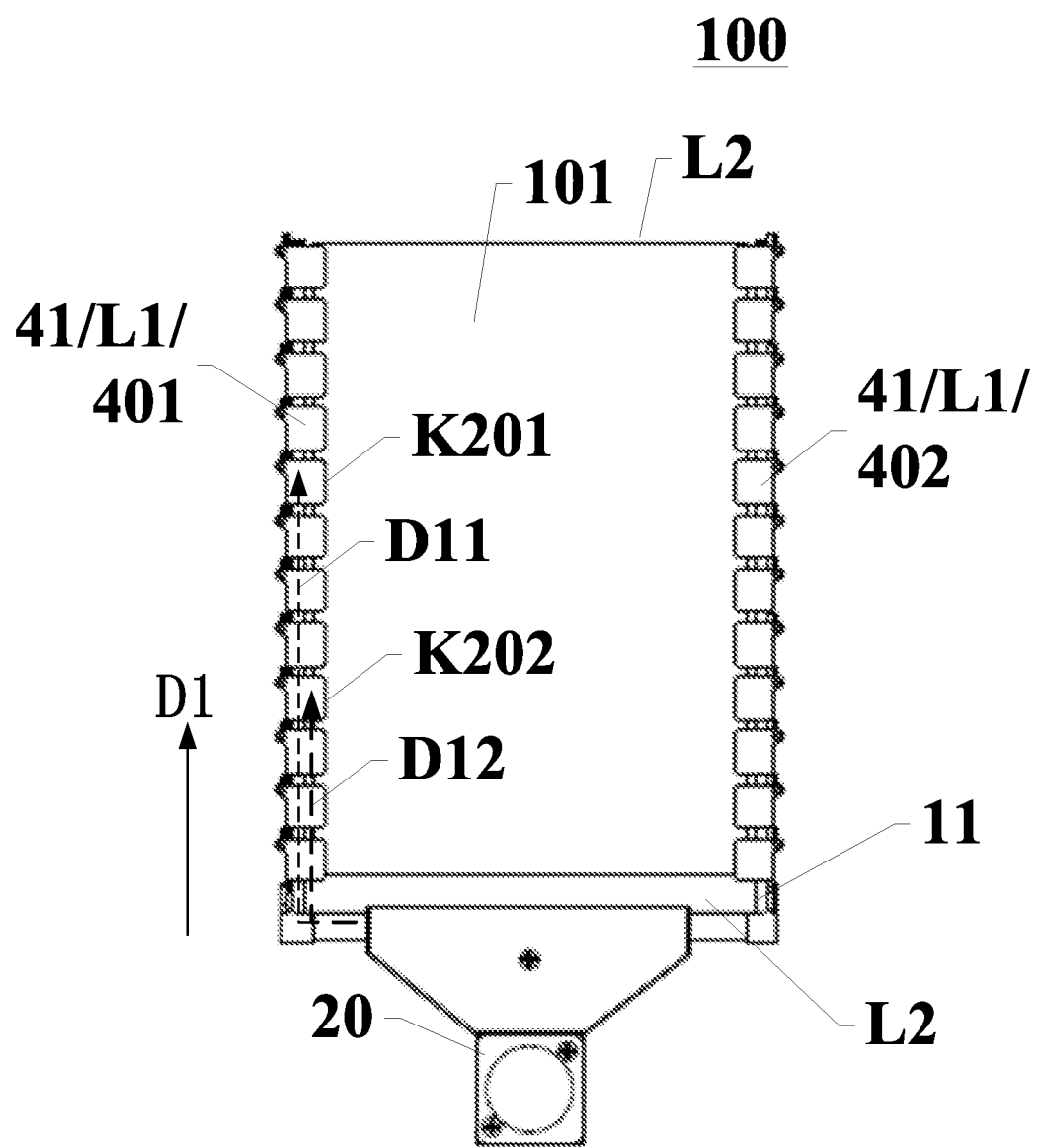
FIG. 10 illustrates another exemplary flexible display module consistent with various disclosed embodiments of the present disclosure.
Figure 11:
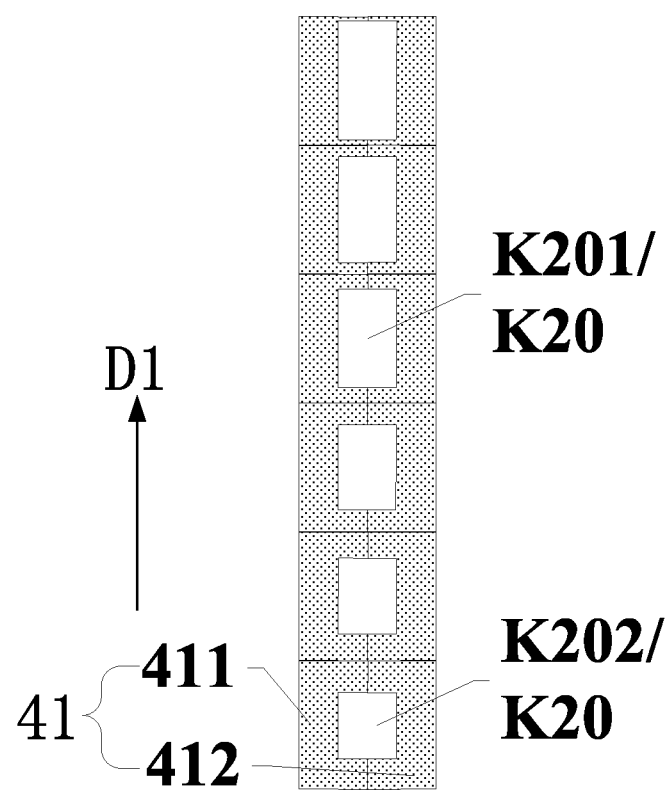
FIG. 11 illustrates an exemplary structure in which the opening on the plurality of hinge units is a close opening consistent with various disclosed embodiments of the present disclosure.

FIG. 10 illustrates another exemplary structural diagram of a flexible display module 100 consistent with various disclosed embodiments of the present disclosure. FIG. 11 illustrates another exemplary configuration where the openings K2 on the plurality of hinge units 41 corresponding to FIG. 10 are all closed openings. FIG. 11 is an exemplary view of the opening of the hinge units 41 from the flexible display panel 101 to the hinge units 41 in the perspective shown in FIG. 10. As shown in FIGS. 10-11, the sub-openings K20 may include a first sub-opening K201 and a second sub-opening K202. The path for the airflow flowing from the fan to the first sub-opening K201 may be the airflow path D11, and the path for the airflow flowing from the fan to the second sub-opening K202 may be the airflow path D12. D11 may be greater than D12, and the area of the first sub-opening K201 may be greater than the area of the second sub-opening K202.

For example, referring to FIG. 10 and FIG. 11, the corresponding sizes of the sub-openings K20 on the plurality of hinge units 41 may not be completely the same. Along the direction of the airflow (i.e., the direction D1 in the figure), the distance between the first sub-opening K201 and the fan may be greater than the distance between the second sub-opening K202 and the fan. For example, when the airflow formed by the fan is flowing in the first air tube 11, it may first pass through the position corresponding to the second sub-opening K202, and then pass through the position corresponding to the first sub-opening K201. That is, the air flow path for the airflow being transmitted from the fan to the first sub-opening K201 may be relatively large, and the airflow path for the airflow being transmitted from the fan to the second sub-opening K202 may be relatively short. When the area of each sub-opening K20 is set to be equal along the direction of the airflow, the airflow received by the sub-opening K20 farther from the fan may be smaller than the airflow received by the sub-opening K20 closer to the fan. In the present disclosure, the area of the first sub-opening K201 farther from the fan may be designed to be greater than the area of the second sub-opening K202 closer to the fan. Such a configuration may be equivalent to increasing the airflow received by the first sub-opening K201 far away from the fan to a certain extent. Thus, the airflow rate that the first sub-opening K201 can receive may be similar to the airflow rate that the second sub-opening K202 can receive. In other words, the airflow rate flowing from the first sub-opening K201 to the surface of the flexible display panel 101 may be similar to the airflow rate flowing from the second sub-opening K202 to the surface of the flexible display panel 101. Accordingly, the heat dissipation effect corresponding to different areas of the flexible display panel 101 may be similar, and the heat dissipation in different areas of the flexible display panel 101 may be more even.

In one embodiment, along the direction of the airflow, i.e., along the direction D1 shown in FIG. 10 and FIG. 11, the area of the sub-openings K20 is increased sequentially. Such a configuration may facilitate to balance the air received by the sub-openings K20 in different regions; and may cause the airflow rate provided by each sub-opening K20 to the surface of the flexible display panel 101 to be approximately same. Accordingly, the heat dissipation effect of different areas of the flexible display panel 101 may be closer to same; and the overall heat dissipation uniformity of the flexible display panel 101 may be improved. It should be noted that, when the area of the sub-openings K20 is increased sequentially, the length of the sub-openings K20 along the direction D1 may be increased sequentially, or the length of the sub-openings K20 along the direction perpendicular to the direction D1 may be increased in sequence, or the length of the sub-opening K20 along two directions (the direction D1 and the direction perpendicular to the direction D1) may be increased in sequence.

In some embodiments of the present disclosure, referring to FIG. 9, the areas of the sub-openings K20 may be equal.

In one embodiment, the area of the sub-opening K20 corresponding to each hinge unit 41 in the embodiment shown in FIG. 9 may be same. In such a configuration, each hinge unit 41 may be set to have the same structure. When the multiple hinge units 41 are fixed to the display panel, or when the first air tube 11 is fixed to a plurality of hinge units 41, there may be no need to distinguish hinge units 41 of different structures. Thus, the installation efficiency may be improved. At the same time, the hinge units 41 with the same structure may be produced using the same mold, and the production efficiency of hinge units 41 may be improved.

In some embodiments, referring to FIGS. 6-7, the hinge units 41 may include a plurality of air ducts 50, and the air duct 50 may connect the sub-air outlet K1 and the sub-opening K20. The sub-air outlet K1 may serve as the air inlet of the air duct 50, and the sub-opening K20 may serve as the air outlet of the air duct 50. Each of the air ducts 50 may include a first air duct 51 and a second air duct 52 connected to each other. The extension direction of the first air duct 51 and the extension direction of the second air duct 52 may intersect. Along a direction perpendicular to the flexible display panel 101, the first air duct 51 and the flexible display panel 101 may overlap;

Referring to FIG. 10, the side edges of the flexible display panel 101 may include two opposite first side edges L1 and a second side edge L2 adjacent to the two first side edges L1. The hinge units 41 may be fixed to the first side edge L1, and the fan assembly 20 may be fixed to the second side edge L2.

For example, as shown in FIGS. 6-7 and FIG. 10, each hinge unit 41 may include an air duct 50 that connects the sub-air outlet K1 on the first air tube 11 and the sub-opening K20 of the hinge unit 41. When the airflow formed by the fan flows out through the first sub-air outlet K1 of the first air tube 11, the first sub-air outlet K1 may serve as the air inlet of the air duct 50, and the airflow flows into the air duct 50. The hinge unit 41 of the sub-opening K20 may serves as an air outlet of the air duct 50, and the airflow flowing through the air duct 50 may flow from the sub-opening K20 of the hinge unit 41 to the surface of the flexible display panel 101.

As shown in FIGS. 6-7, the air duct 50 corresponding to each hinge unit 41 may include a first air duct 51 and a second air duct 52 that have a through-connection with each other, and the extension direction of the first air duct 51 and the extension direction of the second air duct 52 may be different. Along the direction perpendicular to the flexible display panel 101, the first air duct 51 may overlap the flexible display panel 101. For example, the first air duct 51 may be located on the side of the first surface or the second surface of the flexible display panel 101. During the heat dissipation process, the airflow formed by the fan may flow through the first air tube 11, the second air duct 52 and the first air duct 51 in sequence, and may flow from the sub-opening K20 of the hinge unit 41 to the surface of the flexible display panel 101. When the first air duct 51 is arranged on the first surface or the second surface of the flexible display panel 101, and the first air duct 51 and the flexible display panel 101 may overlap along the direction perpendicular to the flexible display panel 101, it may be equivalent to reduce the distance between the air outlet (the sub-opening K20 of the hinge unit 41) and the flexible display panel 101. Thus, the airflow may directly flow to the surface of the flexible display panel 101 to cool and dissipate the flexible display panel 101; and the airflow may be effectively utilized.

Further, referring to FIG. 10, the flexible display panel 101 in the present disclosure may include two opposite first side edges L1 and a second side edge L2 respectively adjacent to the first side edges L1. In one embodiment, the hinge units 41 and the first air tube 11 may be arranged on the first side edge L1, and the fan assembly 20 may fixed on the second side edge L2. In one embodiment, the hinge units 41 and the first air tube 11 may be respectively disposed on the two first side edges L1. The fan assembly 20 located at the second side edge L2 may provide the airflow to the air tube fixed to the two first side edges L1. Thus, the airflow provided to the surface of the flexible display panel 101 during the heat dissipation process may be increased, and the heat dissipation effect of the flexible display panel 101 may be enhanced.

Figure 12:
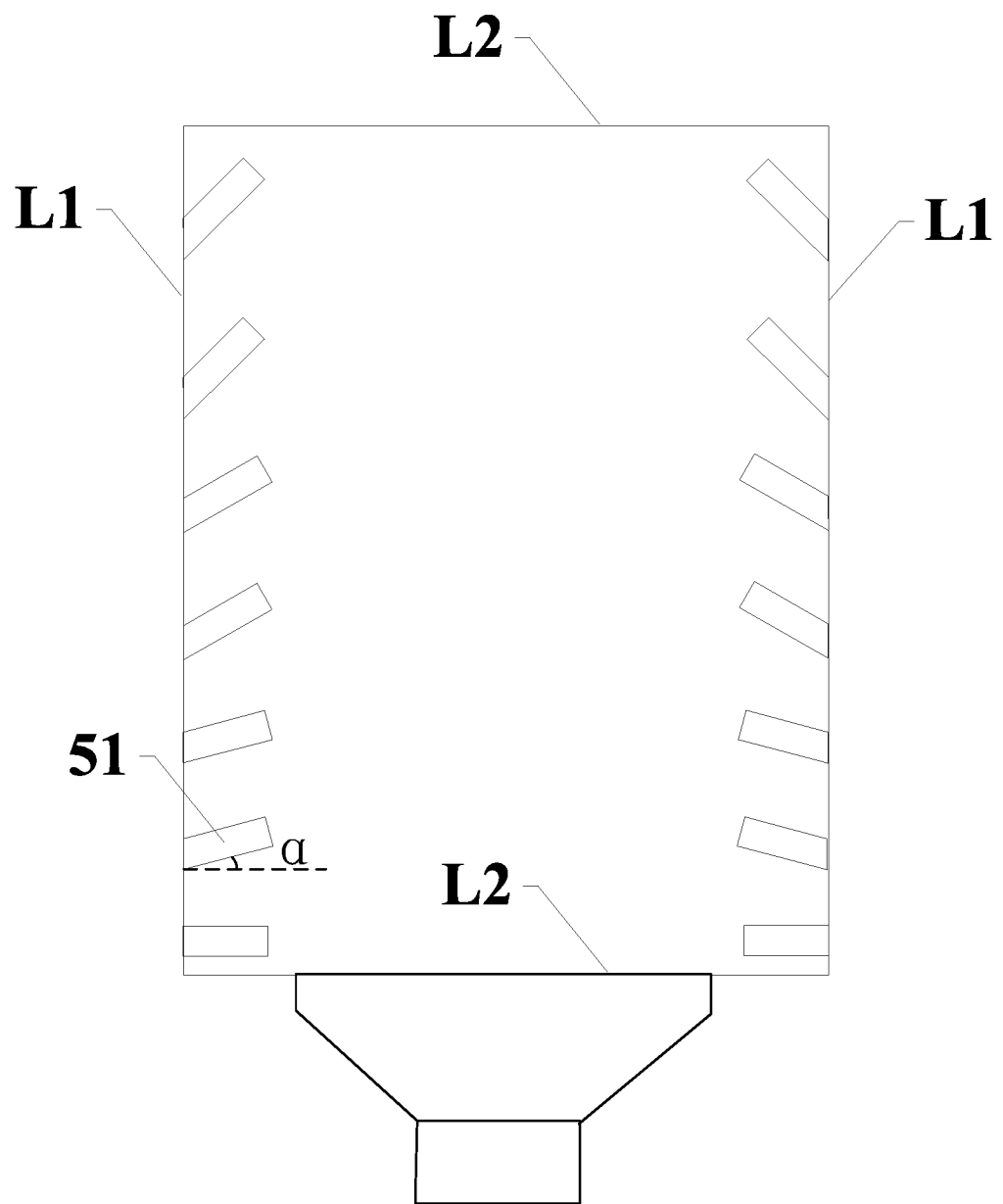
FIG. 12 illustrates an exemplary relative position between a first air tube and a flexible display panel consistent with various disclosed embodiments of the present disclosure.

FIG. 12 illustrates a schematic diagram of a relative position of the first air duct 51 and the flexible display panel 101. As shown in in FIG. 12, the angle between the extension direction of the first air duct 51 and the extending direction of the second side edge L2 may be a first angle $\alpha$, and the first angel $\alpha$ may be less than 90°. Along the flow direction of the airflow in the first air tube 11, the first angle $\alpha$ corresponding to each first air duct may be sequentially increased.

For example, each hinge unit 41 may correspond to an air duct 50, and the first angle $\alpha$ between the first air duct 51 and the extension direction of the second side edge L2 in each air duct 50 may be set not to be all same. Along the flow direction of the airflow in the first air tube 11, the first angle $\alpha$ may be increased. The angle between the first air duct 51 and the second side edge L2 may define the direction of the airflow from the first air duct 51. When the first air tubes 11 provided on the two first side edges L1 of the flexible display panel 101 may provide the airflow to the flexible display panel 101, the first angle $\alpha$ may be set in an increasing trend, the impulses of the airflow provided by the oppositely disposed first air ducts 51 to the surface of the flexible display panel 101 may be avoided. When two facing airflows impact to each other, the airflow at the impacting location may rebound along a direction away from the surface of the flexible display panel 101. Thus, the effective utilization of the airflow may be reduced. Thus, the design of the first angle $\alpha$ in the present disclosure may also facilitate to improve the effective utilization of the airflow.

Figure 13:
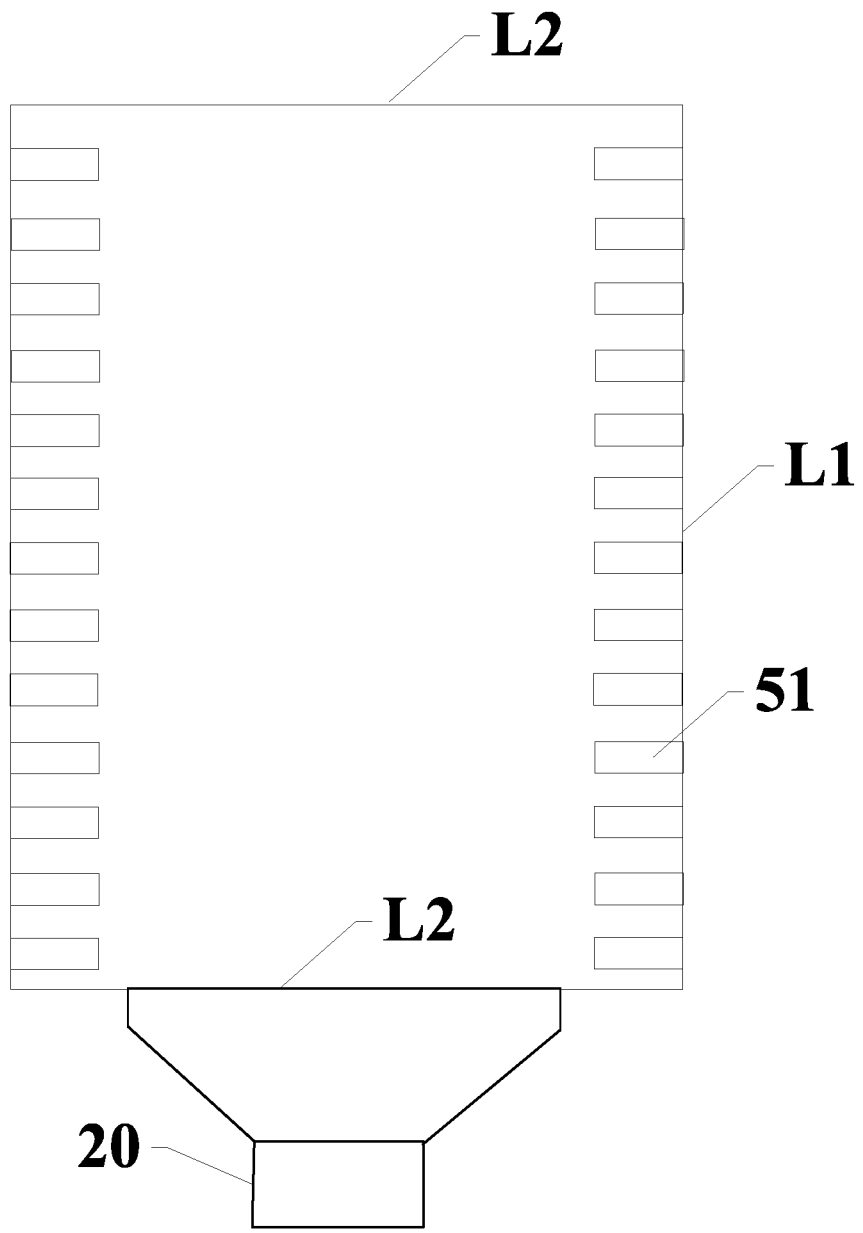
FIG. 13 illustrates another exemplary relative position between a first air tube and a flexible display panel consistent with various disclosed embodiments of the present disclosure.

FIG. 13 illustrates a schematic diagram showing another relative position of the first air duct 51 and the flexible display panel 101. As shown in FIG. 13, the extension direction of each first air duct 51 may be parallel to the extension direction of the second side edge L2.

FIG. 13 shows a structure in which each first air duct 51 and the second side edge L2 corresponding to the hinge unit 41 are arranged in parallel. For example, the first angle $\alpha$ between each hinge unit 41 of the first air duct 51 and the second side edge L2 may be 0°. When making each hinge unit 41, same process parameters may be used to make the first air ducts 51, and the structure of each hinge unit 41 may be set to be exactly the same. Thus, a same mold may be used to form the hinge units 41. Accordingly, the design difficulty of the hinge structures may be simplified, and the production efficiency of the hinge units 41 may be improved. It should be noted that, when the hinge units 41 and the first air tube 11 shown in FIG. 10 are respectively provided on the two first side edges L1 of the flexible display panel 101, the two first air ducts 51 arranged oppositely may be able to simultaneously provide the heat dissipation airflow to the same area, which may facilitate to improve the heat dissipation efficiency of the flexible display panel 101. To avoid the phenomenon that the airflow provided by the two opposite first air tubes 11 has a relatively strong relative impact, the sub-openings K20 (that is, the air outlet of the first air duct 51) of the hinge units 41 arranged on the two first side edges L1 may be set in a staggered arrangement, which will be described in detail later.

In another embodiment, referring to FIGS. 6-7, the hinge unit 41 may include an upper hinge cover 411 and a lower hinge cover 412 that are arranged oppositely. One side of the upper hinge cover 411 facing the lower hinge cover 412 may include a concave side surface, and the side of the lower hinge cover 412 facing the upper hinge cover 411 may include a convex side surface. The concave side surface and the convex side surface may enclose (or form) the air duct 50.

For example, the hinge unit 41 in the present disclosure may be composed of a two-part structure of the upper hinge cover 411 and the lower hinge cover 412. The upper hinge cover 411 and the lower hinge cover 412 may be relatively buckled to form the hinge structure. The side of the upper hinge cover 411 facing the lower hinge cover 412 may include a concave side surface, and the side of the lower hinge cover 412 facing the upper hinge cover 411 may include a convex side surface. The concave side surface and the convex side surface may form the air duct 50 of the hinge unit 41. The portion of the air duct 50 that overlaps the flexible display panel 101 along the direction perpendicular to the flexible display panel 101 may be the first air duct 51, and the portion of the first air duct 51 away from the flexible display panel 101 may be the second air duct 52. The air duct 50 may be formed by processing the surfaces of the upper hinge cover 411 and the lower hinge cover 412; and the tedious process of introducing a separate air duct 50 into the hinge unit 41 may be avoided. In one embodiment, the side of the upper hinge cover 411 facing the lower hinge cover 412 may also include an arc-shaped surface. At the same time, the side of the lower hinge cover 412 facing the upper hinge cover 411 may also include an arc-shaped surface. When the upper hinge cover 411 and the lower hinge cover 412 are buckled together, the two arc-shaped surfaces may form a host space 42 for placing and fixing the first air tube 11. In one embodiment, the inner diameter of the host space 42 may match the outer diameter of the first air tube 11. Thus, the first air duct 11 may be better fixed.

In another embodiment, referring to FIG. 7, along the direction in which the hinge unit 41 points to the flexible display panel 101, the orthographic projection of the center line of the first air tube 11 toward the side edge of the flexible display panel 101 may be located within the range defined by the side edges. In such a design, the distance between the neutral surface of the hinge unit 41 and the neutral surface of the flexible display panel 101 along the direction perpendicular to the flexible display panel 101 may be smaller. For example, the neutral surface of the hinge unit 41 and the neutral surface of the flexible display panel 101 may be closer. When the side edge of the flexible display panel 101 is fixed with the hinge unit 41 close to the neutral surface of the flexible display panel 101, the overall thickness of the flexible display module 100 may be more uniform, and the light-exiting surface of the flexible display panel may be more close to the light-exiting surface of the entire display module (such as the cover of the flexible display module) to avoid affecting the touch sensitivity of the flexible display module after the introduction of heat dissipation components.

In another embodiment, referring to FIG. 10, the side edges of the flexible display panel 101 may include two opposite first side edges L1 and the second side edge L2 respectively adjacent to the two first side edges L1. The fan assembly 20 may be fixed to the second side edge L2.

The hinge units 41 may include a plurality of first hinge units 401 and a plurality of second hinge units 402. The plurality of first hinge units 401 and the plurality of second hinge units 402 are respectively fixed to different first side edges L1.

For example, in the present disclosure, the first hinge units 401 and the second hinge units 402 may be respectively fixed on the two first side edges L1 of the flexible display panel 101. The first hinge units 401 and the second hinge units 402 may be respectively disposed with the first air tube 11. When the fan is activated to dissipate heat from the flexible display panel 101, the airflow formed by the fan may be provided to the first air tube 11 in the first hinge units 401 and the second hinge units 402, and then flow toward the surface of the flexible display panel 101 from the two first side edges L1 of the flexible display panel 101 respectively. Such a method may facilitate to increase the airflow provided to the flexible display panel 101, and the overall heat dissipation efficiency of the flexible display module 100 may be improved.

Figure 14:
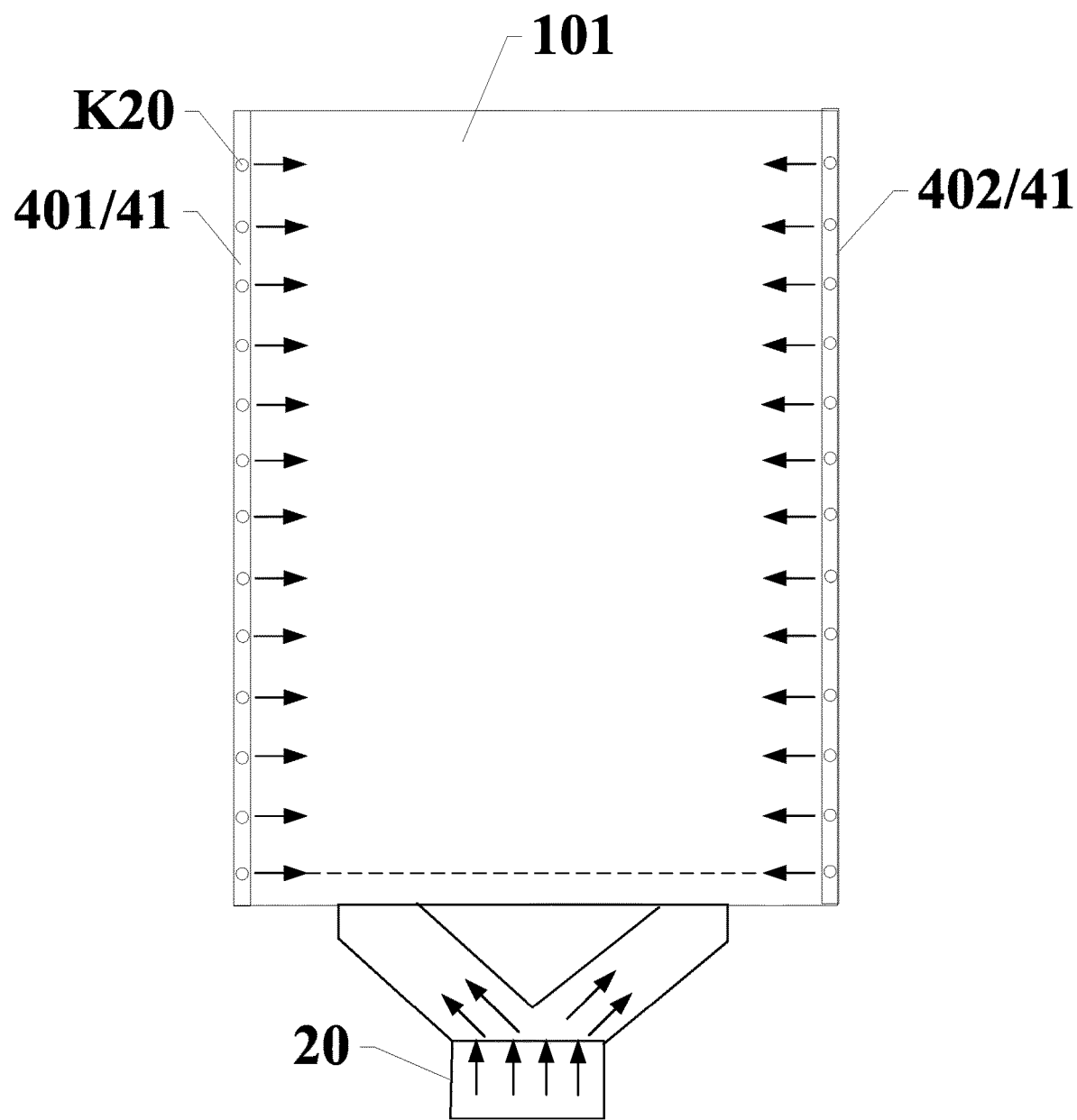
FIG. 14 illustrates an exemplary display module consistent with various disclosed embodiments of the present disclosure.

FIG. 14 is a schematic diagram of another exemplary flexible display module 100 consistent with various disclosed embodiments of the present disclosure. The sub-openings K20 of the first hinge unit 401 and the sub-openings K20 of the second hinge unit 402 may be symmetrically disposed on two sides of the flexible display panel 101.

For example, the sub-openings K20 of the first hinge unit 401 and the sub-openings K20 of the second hinge unit 402 may serve as air outlets during the heat dissipation process, and the airflow formed by the fan may pass through the sub-openings K20 of the first hinge unit 401 and the sub-opening K20 of the second hinged unit 402 and may flow toward the surface of the flexible display panel 101. The arrow in FIG. 14 shows the direction of the airflow. In such a configuration, when the sub-opening K20 of the first hinge unit 401 and the sub-opening K20 of the second hinge unit 402 are disposed in a symmetrical arrangement, the two sub-openings K20 arranged in one-to-one correspondence may simultaneously provide the heat dissipation airflow to a same area of the flexible display panel 101. Thus, the heat dissipation airflow in each area of the flexible display panel 101 may be increased, and the heat dissipation effect of the flexible display panel 101 may be enhanced.

It should be noted that, to clearly reflect the relative positional relationship between the sub-opening K20 in the first hinge unit 401 and the sub-opening K20 in the second hinge unit 402, FIG. 14 illustrates each sub-opening K20 through a circular opening. In the actual product, each sub-opening K20 may actually face the flexible display panel 101, and the sub-opening K20 may not be visible in the top view. Further, to clearly reflect the positional relationship between the sub-opening K20 in the first hinge unit 401 and the sub-opening K20 in the second hinge unit 402, FIG. 14 only briefly illustrates the first hinge unit 401 and the second hinge unit 402, the specific structure of the first hinge unit 401 and the second hinge unit 402 may be referred to FIG. 10.

Figure 15:
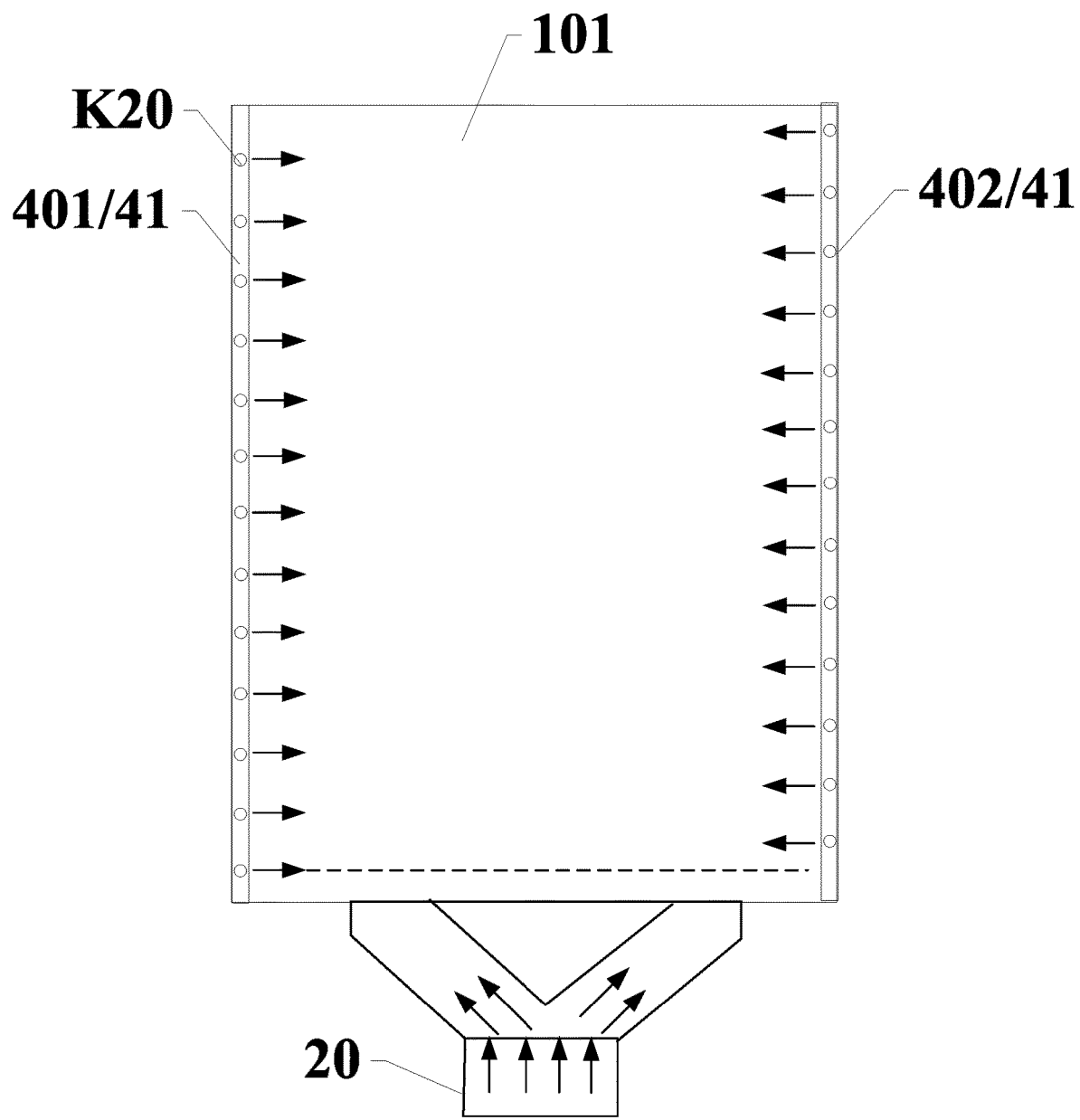
FIG. 15 illustrates an exemplary display module consistent with various disclosed embodiments of the present disclosure.

FIG. 15 is a schematic diagram of another exemplary flexible display module 100 consistent with various disclosed embodiment of the present disclosure. Along the extension direction of the first side edge L1, the sub-openings K20 in the first hinge unit 401 and the sub-openings K20 in the second hinge unit 402 may be alternately arranged.

For example, the embodiment shown in FIG. 15 shows a scheme in which the sub-openings K20 in the first hinge units 401 and the sub-openings K20 in the second hinge units 402 are staggered, or alternately distributed. When the sub-openings K20 in the first hinge units 401 and the sub-openings K20 in the second hinge units 402 are alternately arranged, the direction of the airflow provided from the sub-opening K20 of the first hinge unit 401 to the flexible display panel 101 and the direction of the airflow that provided from the sub-opening K20 of the second hinge unit 402 to the flexible display panel 101 are also staggered, as indicated by the horizontal arrow in FIG. 15. In such a configuration, the sub-openings K20 in the first hinge units 401 and the sub-openings K20 in the second hinge units 402 may be targeted to different areas of the flexible display panel 101 respectively to provide the heat dissipation. Accordingly, the heat dissipation effect of the flexible display panel 101 may be enhanced.

It should be noted that, to clearly reflect the relative positional relationship between the sub-openings K20 in the first hinge unit 401 and the sub-openings K20 in the second hinge units 402, FIG. 15 illustrates each sub-opening K20 through the circular opening K2. In an actual product, each sub-opening K20 may actually face the flexible display panel 101, and the sub-openings K20 may not be visible from the top view. Further, to clearly reflect the positional relationship between the sub-openings K20 in the first hinge units 401 and the sub-openings K20 in the second hinge units 402, FIG. 15 only briefly illustrates the first hinge units 401 and the second hinge units 402, the specific structure of the first hinge units 401 and the second hinge units 402 may be referred to FIG. 10.

Figure 16:
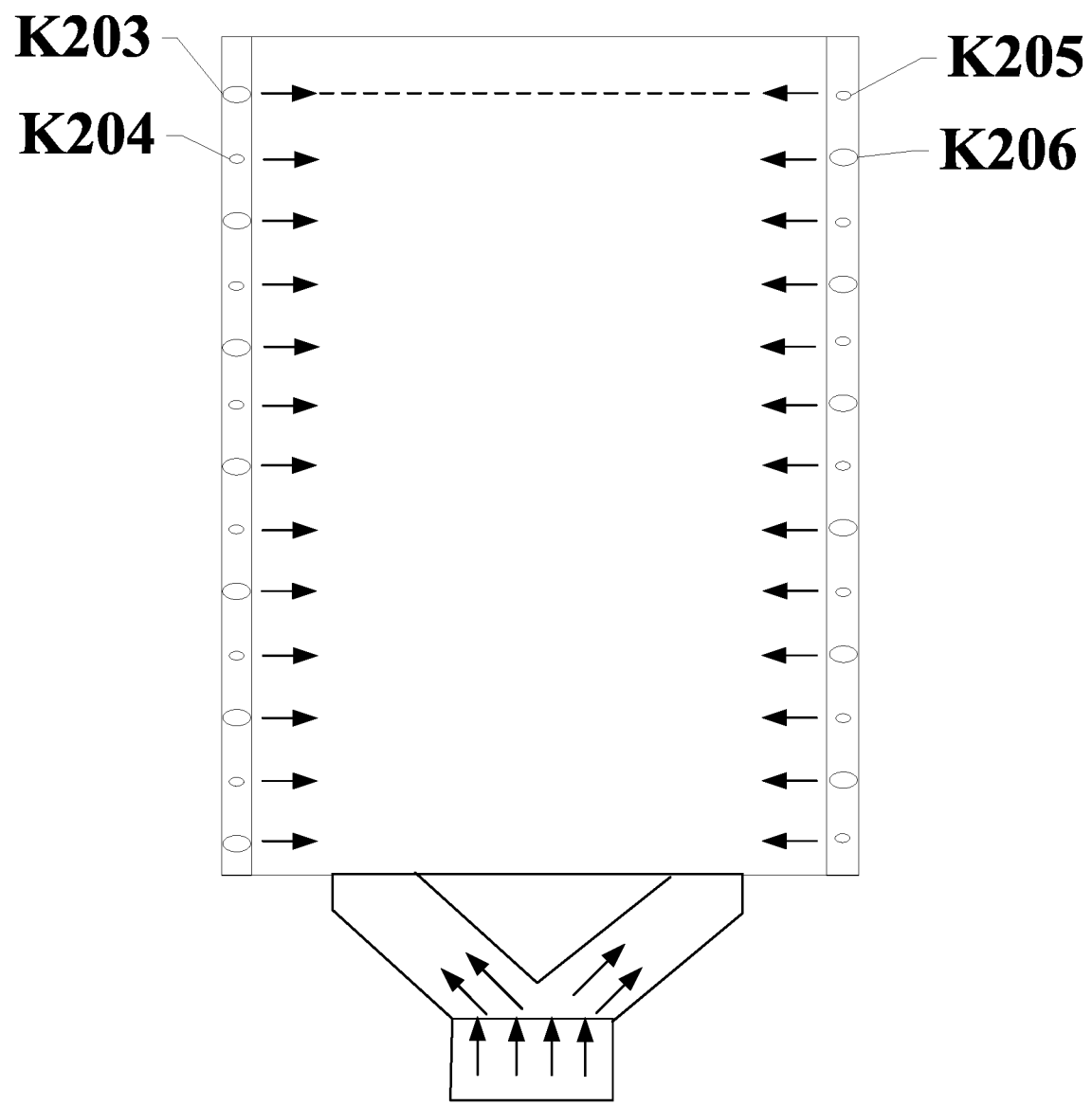
FIG. 16 illustrates an exemplary display module consistent with various disclosed embodiments of the present disclosure.

FIG. 16 is a schematic diagram of another exemplary flexible display module 100 consistent with various disclosed embodiments of the present disclosure. As shown in FIG. 16, the sub-openings K20 in the first hinge units 401 may include third sub-openings K203 and fourth sub-openings K204 that are alternately arranged along the extending direction of the side edge. The area of the third sub-opening K203 may be greater than the area of the fourth sub-opening K204. The sub-openings K20 in the second hinge units 402 may include fifth sub-openings K205 and sixth sub-openings K206 that are alternately arranged along the extension direction of the side edge. The area of the fifth sub-opening K205 may be smaller than the area of the sixth sub-opening K206. The third sub-openings K203 and the fifth sub-openings K205 may be arranged in a one-to-one correspondence, and the fourth sub-openings K204 and the sixth sub-openings K206 may be arranged in a one-to-one correspondence.

For example, FIG. 16 shows the configuration that the first hinge units 401 may include third sub-openings K203 and fourth sub-openings K204 with different areas, and the second hinge units 402 may include fifth sub-openings K205 and sixth sub-openings K206 with different areas. Along the extension direction of the side edge, the third sub-openings K203 and the fourth sub-openings K204 may be alternately arranged on the same side edge, and the fifth sub-openings K205 and the sixth sub-openings K206 may be alternately arranged on the other side edge. Further, along the direction from one side edge of the hinge unit 41 pointing to the other side edge, the third sub-openings K203 with a larger area and the fifth sub-opening K205 with a smaller area may be arranged in a one-to-one correspondence, and the fourth sub-openings K204 with a smaller area and the sixth sub-openings K206 with a larger area may be arranged in a one-to-one correspondence. The airflow rate provided by the sub-openings K20 is positively correlated with the area of the sub-openings K20. In another word, the larger the area of the sub-opening K20 is, the larger the flow rate it can provide; and the smaller the area of the sub-opening K20 is, the smaller the air flow rate it can provide. In the present disclosure, when the sub-opening K20 with a larger area and the sub-opening K20 with a smaller area are arranged correspondingly, the sub-opening K20 with a larger area provides a larger air flow rate, and the sub-opening K20 with a smaller area provides a smaller air flow rate. When the sub-openings K20 arranged in one-to-one correspondence provide the airflow, the possibility of the large airflow and the small airflow impacting relative to each other may be reduced, the waste caused by the impact of the airflow may be avoided. Thus, while achieving the surface heat dissipation of the flexible display panel 101, the effective utilization of the airflow may be improved.

Figure 17:
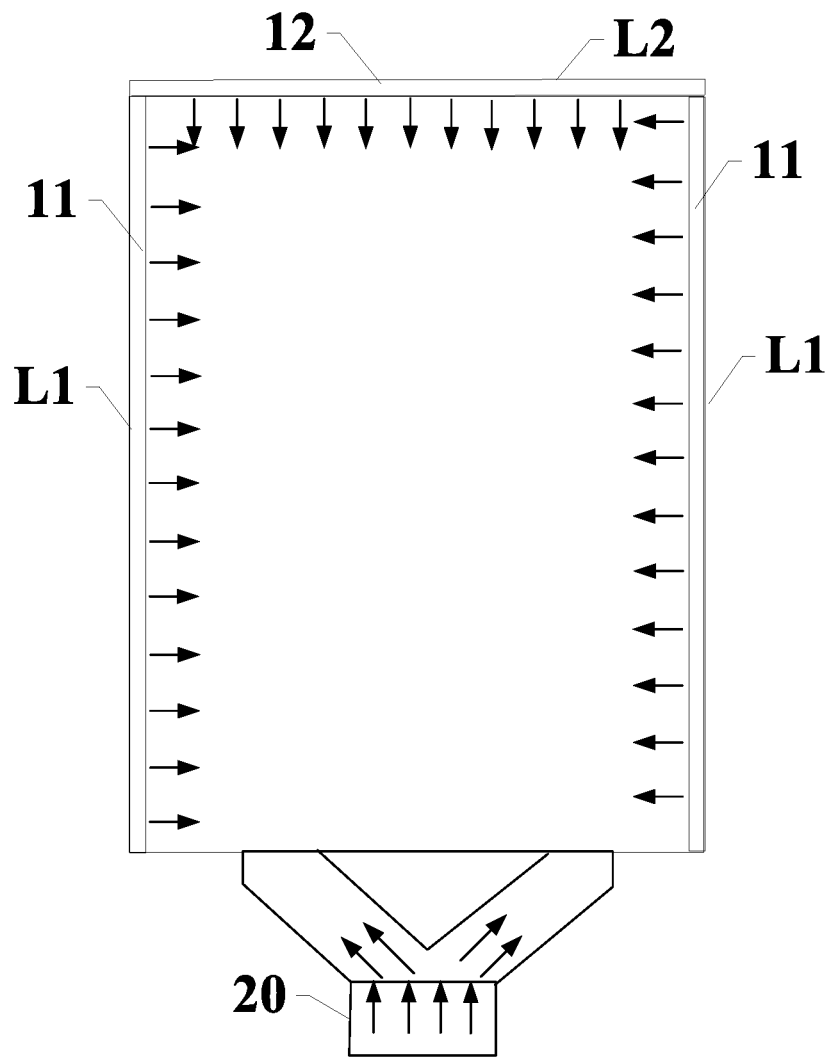
FIG. 17 illustrates an exemplary display module consistent with various disclosed embodiments of the present disclosure.

FIG. 17 is a schematic diagram of another exemplary flexible display module 100 consistent with various disclosed embodiments of the present disclosure. As shown in FIG. 17, the heat dissipation assembly may further include a second air tube 12. The second air tube 12 may be disposed at the second side edge L2. The fan assembly 20 may also provide the airflow to the surface of the flexible display panel 101 through the second air tube 12.

For example, FIG. 17 shows the configuration that the first air tube 11 may be provided on the two first side edges L1 of the flexible display panel 101, and the second air tube 12 may be provided on the second side edge L2 of the flexible display panel 101. When the heat dissipation is required, the air tubes arranged on the three side edges of the flexible display panel 101 may be used to provide the airflow to the surface of the flexible display panel 101 to increase the airflow rate of the flexible display panel 101 during the heat dissipation process. Thus, the heat dissipation time of the flexible display panel 101 may be reduced; and the heat dissipation efficiency of the flexible display panel 101 may be improved.

It should be noted that the second air tube 12 provided with the second side edge L2 of the flexible display panel 101 may also be fixed by the hinge units 41. The fixing method may be referred to the fixing method of the hinge units 41 to the first air tube 11. Other feasible fixing methods may also be used, and the present disclosure will not be repeated here.

In another embodiment, referring to FIGS. 6-7, the hinge unit 41 may include a hinge upper cover 411 and a hinge lower cover 412 that are disposed oppositely. The first surface of the hinge upper cover 411 may include a first concave portion. The first surface of the lower hinge cover 412 may include a second concave portion. The first surface of the upper hinge cover 411 may be buckled with the first surface of the lower hinge cover 412 oppositely, and the first concave portion and the second concave portion may form the host space 42.

FIG. 6 illustrates the specific structure of the hinge unit 41. The first surface of the upper hinge cover 411 of the hinge unit 41 facing the first surface of the lower hinge cover 412 may be provided with a first concave portion, and the first surface of the lower hinge cover 412 facing the first surface of the upper hinge cover 411 may be provided with a second concave portion. When the upper hinge cover 411 and the lower hinge cover 412 are relatively buckled together, the first concave portion and the second concave portion may be arranged oppositely to form the host space 42 for placing and fixing the first air tube 11. FIG. 6 only takes the first concave portion and the second concave portion of the semicircular structure as an example for description. When the upper hinge cover 411 and the lower hinge cover 412 are buckled together, the first concave portion and second concave portion may form a cylindrical host space 42, which may match the structure of the first air tube 11 with a circular cross-section. In one embodiment, the hardness of the upper hinge cover 411 and the lower hinge cover 412 may be greater than the hardness of the first air tube 11 such that the upper hinge cover 411 and the lower hinge cover 412 may better fix the first air tube 11 to avoid the phenomenon that the first air tube 11 is moved by the impulses of the airflow.

It should be noted that in some other embodiments of the present disclosure, the cross-section of the first air tube 11 may also be embodied in other shapes as required, and the shape of the host space 42 formed by the upper hinge cover 411 and the lower hinge cover 412 may also be adjusted according to the shape of the first air tube 11, which is not specifically limited in the present disclosure.

In another embodiment, referring to FIGS. 6-7, the side of the lower hinge cover 412 facing the flexible display panel 101 may include a first clamping slot 55, and the side edge of the flexible display panel 101 may be located in the first clamping slot 55.

For example, a first clamping slot 55 may be provided on the side of the hinge unit 41 facing the flexible display panel 101. The first clamping slot 55 may be used to clamp the side edge of the flexible display panel 101 to fix the hinge unit 41 and the flexible display panel 101. This embodiment illustrates the structure of the first clamping slot 55 in a form similar to the C-shaped clamping slot. In one embodiment, along the direction perpendicular to the flexible display panel 101, the height h inside the first clamping slot 55 may be equal to or slightly smaller than the thickness of the flexible display panel 101 such that the first clamping slot 55 and the flexible display panel 101 may have an interference fit to improve the reliability of fixing the first clamping slot 55 and the flexible display panel 101.

In one embodiment, before fixing the first clamping slot 55 to the side edge of the flexible display panel 101, a glue may be applied to the first clamping slot 55. After the first clamping slot 55 is fixed to the side edge of the flexible display panel 101, the first clamping slot 55 and the flexible display panel 101 may be further fixed by the glue. Thus, the fixing reliability of the first clamp slot 55 and the flexible display panel 101 may be improved.

In one embodiment, under the viewing angles shown in FIGS. 6-7, the upper wall of the C-shaped clamping slot may also serve as a part of the air outlet of the hinge unit 41. To reduce the distance between the air outlet of the hinge unit 41 and the surface of the flexible display panel 101, the wall thickness t of the upper wall of the C-shaped clamping slot may be set to be in a range of approximately 0.5 mm-1 mm. When the airflow formed by the fan flows out from the air outlet of the hinge unit 41, it may flow to the surface of the flexible display panel 101 at the first time. Thus, the effective utilization of the airflow may be improved. Further, when the wall thickness t of the upper wall of the C-shaped clamping slot is set to 0.5 mm to 1 mm, it may also facilitate to ensure the supporting force of the C-shaped clamping slot on the flexible display panel 101.

In one embodiment, referring to FIGS. 6-7, the surface of the upper hinge cover 411 facing the lower hinge cover 412 may include a first sub-surface S1 and a second sub-surface S2. The side of the lower hinge cover 412 facing the upper hinge cover 411 may include a third sub-surface S3 and a fourth sub-surface S4.

The first sub-surface S1 and the third sub-surface S3 may be disposed oppositely to form a first air duct 51. The second sub-surface S2 and the fourth sub-surface S4 may be disposed oppositely to form a second air duct 52. The first air duct 51 may have a through-connection with the second air duct 52. The air inlet of the second air duct 52 may face the first air tube 11, and the air outlet of the first air duct 51 may face the flexible display panel 101 and may serve as the opening K2 of the hinge unit 41.

For example, referring to FIGS. 6-7, the surface of the upper hinge cover 411 facing the lower hinge cover 412 and the surface of the lower hinge cover 412 facing the upper hinge cover 411 may be both uneven surfaces. The extension direction of the first sub-surface S1 of the upper hinge cover 411 facing the lower hinge cover 412 and the extension direction of the second sub-surface S2 may intersect each other. The extension direction of the third sub-surface S3 of the hinge lower cover 412 facing the upper hinge cover 411 and the extension of the fourth sub-surface S4 may intersect each other. When the upper hinge cover 411 and the lower hinge cover 412 are buckled, the first sub-surface S1 and the third sub-surface S3 may be disposed oppositely to form the first air duct 51. The second sub-surface S2 and the fourth sub-surface S4 may be disposed oppositely to form the second air duct 52. The first air duct 51 and the second air duct 52 may have a through-connection. The first air duct 51 may be located at the side of the second air duct 52 adjacent to the flexible display panel 101. After the heat dissipation airflow formed by the fan flows into the first air tube 11, it may flow to the surface of the flexible display panel 101 through the second air duct 52 and the first air duct 51 in sequence. In the present disclosure, the surfaces of the upper hinge cover 411 and the lower hinge cover 412 may be directly and structurally designed to form the first air duct 51 and the second air duct 52, the manufacturing process of the air duct 50 may be simplified. At the same time, the second air duct 52 may transmit the air flow transmitted by the first air tube 11 to the first air duct 51, and then provide it to the surface of the flexible display panel 101. Thus, the heat dissipation function of the flexible display panel 101 may be achieved. In one embodiment, when the flexible display panel 101 is at a flattened state, the extension direction of the first air duct 51 may be parallel to the surface of the flexible display panel 101.

In another embodiment, referring to FIGS. 6-7, along the direction of the upper hinge cover 411 pointing to the lower hinge cover 412, the first sub-surface S1, the third sub-surface S3 and the first clamping slot 55 may overlap.

For example, the first clamping slot 55 may be used to engage with the flexible display panel 101, and the first air duct 51 may be used to provide the airflow to the surface of the flexible display panel 101. In the viewing angles shown in FIGS. 6-7, when the first air duct 51 and the first clamping slot 55 are arranged to overlap along the direction perpendicular to the flexible display panel 101, the airflow provided by the first air duct 51 may be provided to the surface of the flexible display panel 101 at the first time. Thus, a path for the airflow provided by the first air duct 51 to the surface of the flexible display panel 101 may be reduced; and the effective utilization of the airflow may be improved.

Figure 18:
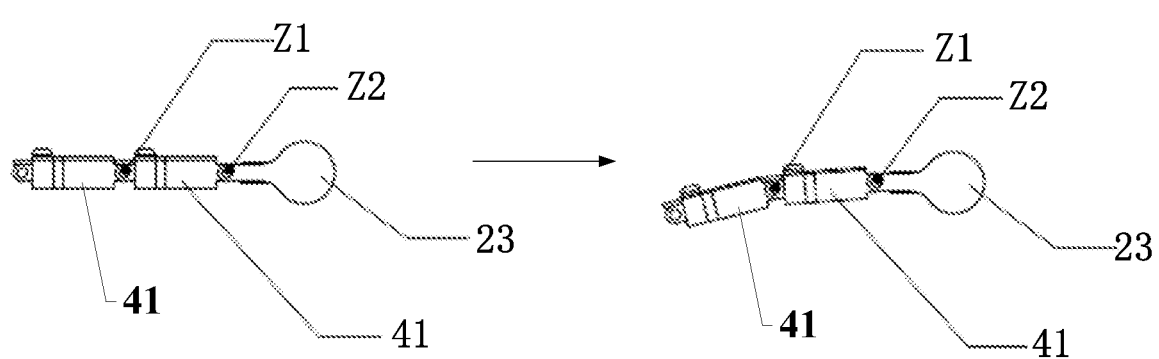
FIG. 18 illustrates an exemplary positional relationship of two adjacent hinge units before and after being rotated consistent with various disclosed embodiments of the present disclosure.
Figure 19:
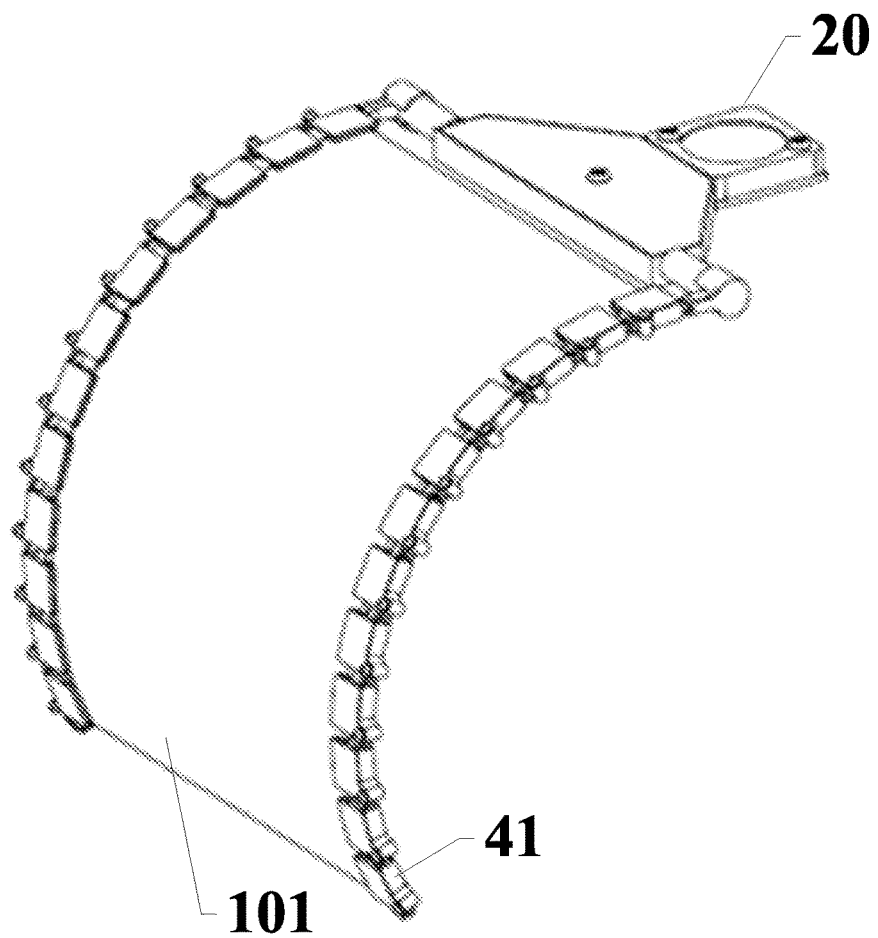
FIG. 19 illustrates an exemplary positional relationship between a hinge unit and a flexible display panel after being bent consistent with various disclosed embodiments of the present disclosure.

FIG. 18 shows a positional relationship diagram of two adjacent hinge units 41 before and after a rotation consistent with various disclosed embodiment of the present disclosure. FIG. 19 illustrates a relative positional relationship between the hinge unit 41 and the flexible display panel 101 after the display panel 101 is bent. Two adjacent hinge units 41 are rotationally connected, and the direction of the rotation may be same as the bending direction of the flexible display panel 101.

For example, in the flexible display module 100 provided by the present disclosure, on the side edge of the flexible display panel 101, two adjacent hinge units 41 are rotatably connected. In one embodiment, the two adjacent hinge units 41 may include a first rotation axis Z1 in between, and one of the hinge units 41 may rotate around the first rotation axis Z relative to the other hinge unit 41. The rotation direction may be same as the bending direction of the flexible display panel 101. In such a configuration, when the flexible display panel 101 is bent, the hinge unit 41 may be correspondingly rotated along the bending direction of the flexible display panel 101. Thus, while satisfying the condition that the flexible display module 100 may be used at a bent state, the heat dissipation of the flexible display module 101 at the bent state may also be achieved. Accordingly, the heat dissipation effect of the flexible display module 100 at the bent state may be improved, and the user experience may be enhanced.

In one embodiment, the first air tube 11 may be a hose. When the flexible display panel 101 is bent, the hinge units 41 may be bent accordingly, and the first air tube 11 fixed by the hinge units 41 may also be bent. The present disclosure sets the first air tube 11 as a hose, the first air tube 11 may have a certain degree of bendability. Thus, the requirement of providing airflow to the flexible display panel 101 at the bent state may be satisfied. For example, the material of the first air tube 11 may be selected from a soft material with certain elasticity, such as polypropylene, polyethylene, or polyvinyl chloride, etc.

It should be noted that when the second air tube 12 is provided on the second side edge L2 of the flexible display panel 101, for example, referring to FIG. 17, generally the second side edge L2 of the flexible display panel 101 does not need to be bent, the second air tube 12 may be arranged as a hard tube structure. For example, the hardness of the second air tube 12 may be greater than that of the first air tube 11.

Figure 20:
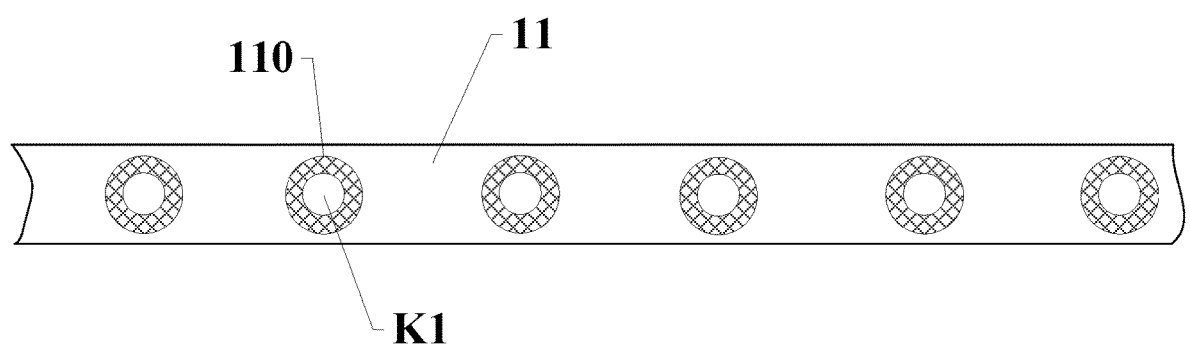
FIG. 20 illustrates an exemplary position of a sub-air outlet corresponding to the first air tube consistent with various disclosed embodiments of the present disclosure.

FIG. 20 is a schematic structural diagram of the position of the sub-air outlet K1 corresponding to the first air tube 11 consistent with various disclosed embodiments of the present disclosure. As shown in FIG. 20, the flexible display module 100 may further include a metal protection portion 110. The metal protection portion 110 may be disposed around the edge of the sub-air outlet K1.

For example, to meet the bending requirements of the flexible display panel 101, the present disclosure may set the first air tube 11 as a flexible tube with a certain bending performance. Because the first air tube 11 may provide the airflow to the flexible display panel 101 through its sub-air outlet K1, when the airflow formed by the fan reaches the sub-air outlet K1 of the first air tube 11, the airflow may have a certain impact on the sub-air outlet K1. To prevent the impact of the airflow from damaging the sub-air outlet K1 of the first air tube 11, in the present disclosure, the metal protection portion 110 may be arranged around the edge of the sub-air outlet K1. The hardness of the metal protective portion 110 may be greater than the hardness of the first air tube 11, thus it may assist the sub-air outlet K1 to resist the airflow; and may provide a desired protective effect on the sub-air outlet K1.

Figure 21:
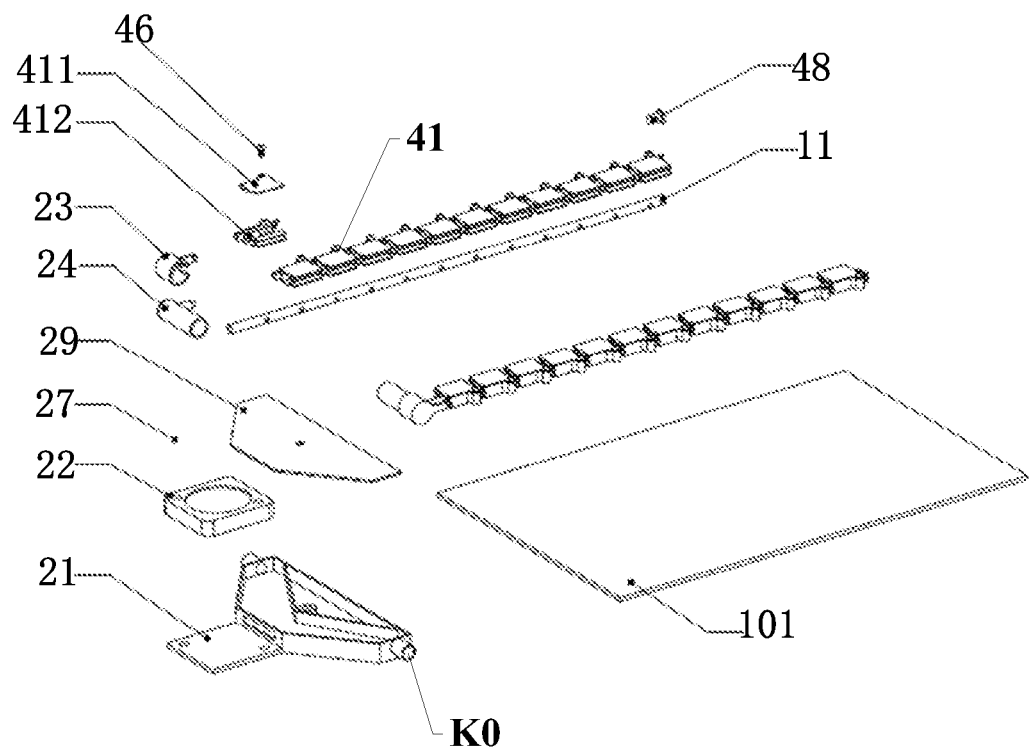
FIG. 21 illustrates an exploded view of another exemplary display module consistent with various disclosed embodiments of the present disclosure.

FIG. 21 is another exploded view of another exemplary flexible display module 100 consistent with various disclosed embodiments of the present disclosure. FIG. 21 illustrates the fan assembly 20 and the connection parts between the fan assembly 20 and the hinge units 41. The fan assembly 20 may also include a fixing base 21, a baffle 29 and screws 27 except the fan 22. The fan 22 may be disposed on the fixing base 21. The baffle 29 may be used to cover the surface of the fixing base 21. The baffle 29 and the fixing base 21 may have a fixed connection through the screws 27. When the hinge units 41 are respectively disposed on the two side edges of the flexible display panel 101, the fan assembly 20 may include two main air outlets K0. The first air tube 11 and the main air outlet K0 of the fan assembly 20 may be fixed by the connection piece 24.

Figure 22:
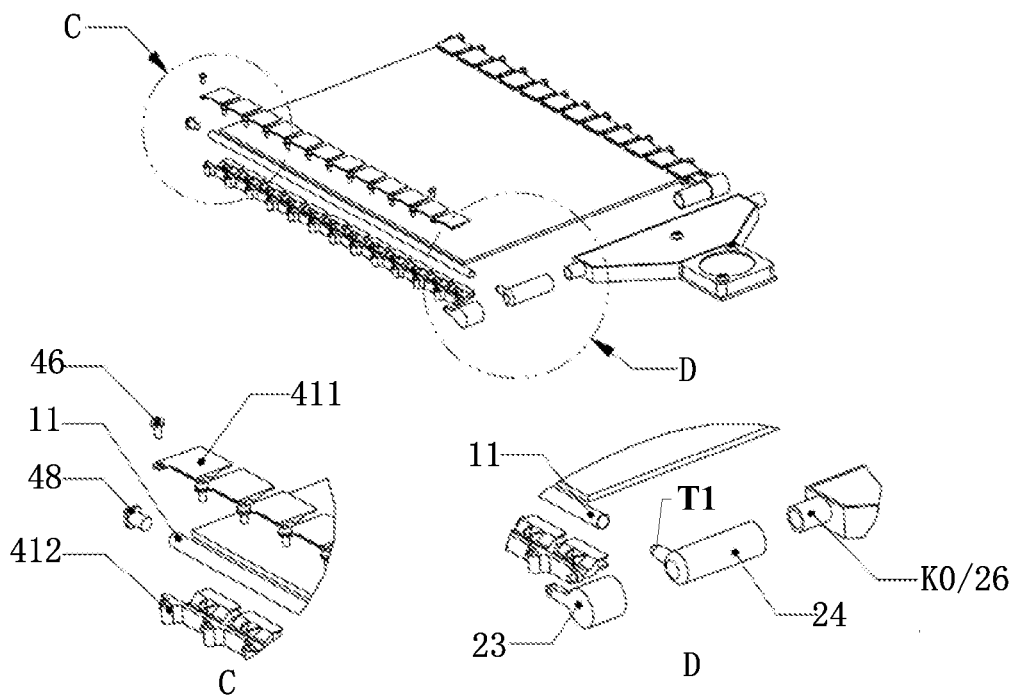
FIG. 22 illustrates a connection of a connection member, a fan assembly and a first air tube of an exemplary display module consistent with various disclosed embodiments of the present disclosure.

FIG. 22 is a schematic diagram of an exemplary connection between the connection member 24 and the fan assembly 20 and the first air tube 11 in the flexible display module 100 consistent with various disclosed embodiments. As shown in FIG. 22, one end of the connection member 24 may be connected to the main air outlet K0 of the fan assembly 20 through a threaded connection. To avoid an air leakage, an end cap 23 may be provided at one end of the connection member 24. The end cap 23 may be fixed on the connection member 24 by a limit design. The connection member 24 may be a hollow structure to realize the air flow transmission. The connection member 24 may also be provided with a hollow protruding structure T1. The first air tube 11 may include two opposing ends: a first end and a second end, respectively. The first end of the first air tube 11 may be sleeved into the protruding structure T1 of the connection member 24 such that the first air tube 11 and the connection member 24 may be connected together, and to achieve a through direction between the first air duct 11 and the fan 22. To improve the effective utilization of the airflow, a top cap 48 may be sleeved on the second end of the first air tube 11, and the second end of the first air tube 11 may be sealed by the top cap 48 to avoid the airflow loss. The upper hinge cover 411 and the lower hinge cover 412 of each hinge unit 41 may be provided with corresponding threaded holes, and the upper hinge cover 411 and the lower hinge cover 412 are threaded through the screws 46 and the threaded holes.

Figure 23:
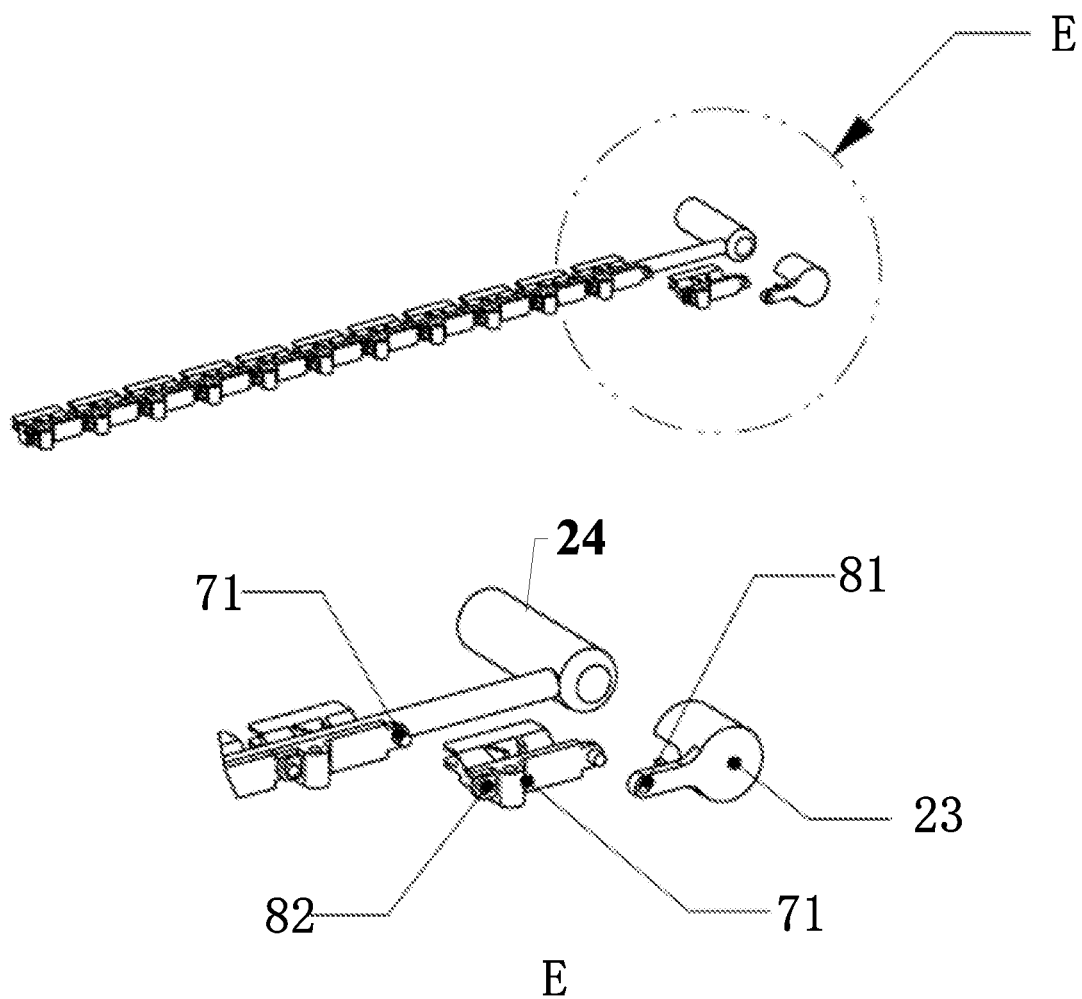
FIG. 23 illustrates an exemplary relative positional relationship of the connection member, an end cap and a hinge unit consistent with various disclosed embodiments of the present disclosure.

FIG. 23 illustrates the relative positional relationship diagram of the connection member 24, the end cover 23 and the hinge unit 41. The lower hinge cover 412 of the hinge unit 41 may be provided with a limiting post 71. The end cover 23 may be provided with a round hole 81. When the end cover 23 is fixed on the connection member 24, the round hole 81 on the end cover 23 may be inserted into the limiting post 71 on the lower hinge cover 412. Thus, the fixed connection between the hinge unit 41 and the end cover 23 may be realized. In one embodiment, each hinge unit 41 may include a limiting post 71 on one side thereof, and a limiting hole 82 on the other side thereof. When the two adjacent hinge units 41 are fixed, the round hole 82 of one hinge unit 41 may be matched with the limiting post 71 of the other hinge unit 41 such that the two-by-two connection of the hinge units 41 among the plurality of hinge units 41 may be realized.

Referring to FIG. 18, a second rotation axis Z2 may be provided between the end cover 23 and its adjacent hinge unit 41. When the flexible display panel 101 is bent, the hinge unit 41 may rotate relative to the end cover 23 around the second rotation axis Z2. Referring to FIG. 23, the limiting post 71 of the hinge unit 41 may be used as a first rotation axis between adjacent hinge units 41 and a second rotation axis between the end cover 23 and the hinge unit 41.

Figure 24:
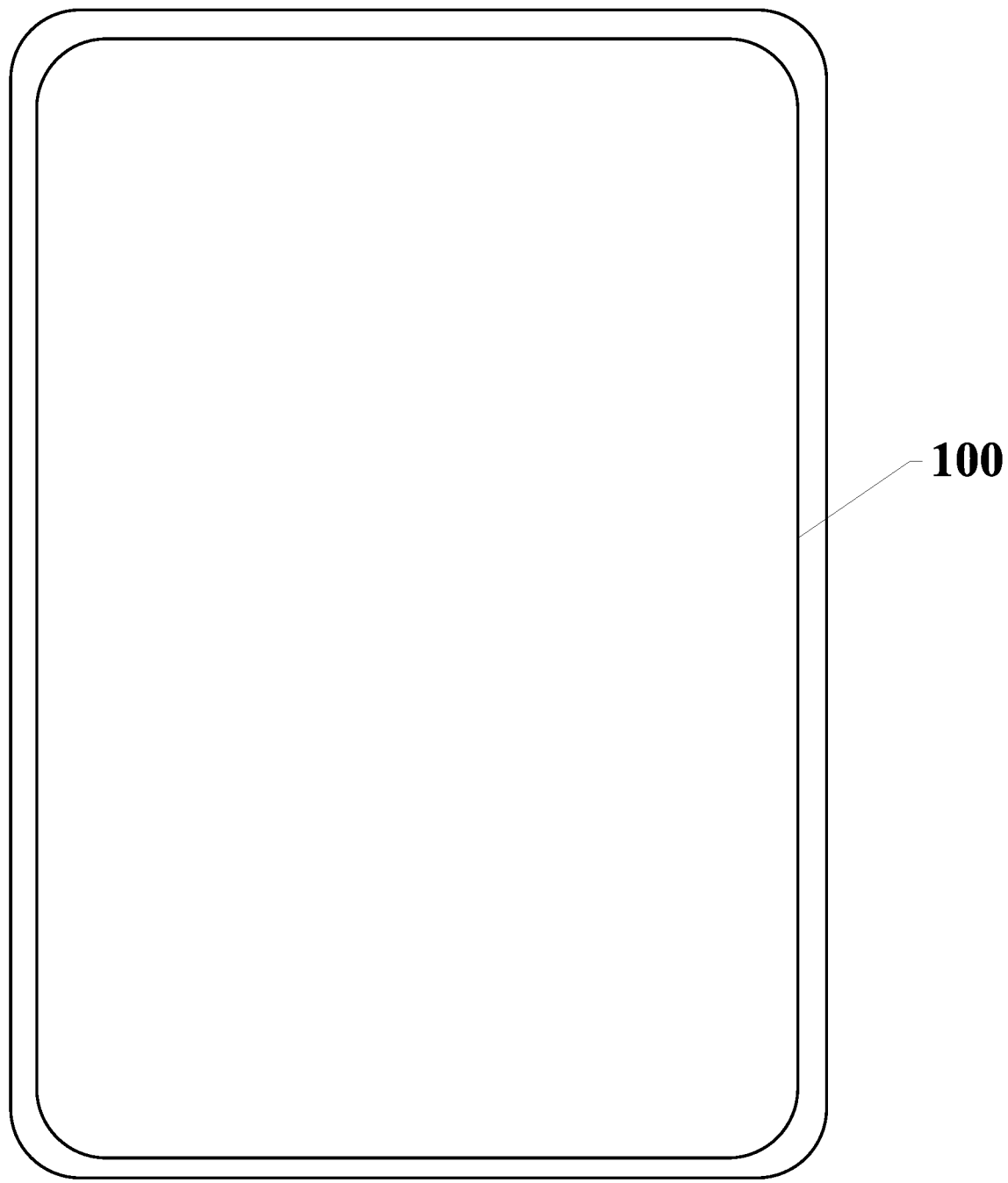
FIG. 24 illustrates an exemplary display device consistent with various disclosed embodiments of the present disclosure.

The present disclosure also provides a display device. FIG. 24 shows a schematic diagram of an exemplary display device consistent with various disclosed embodiment of the present disclosure. As shown in FIG. 24, the display device 200 may include a flexible display module 100. The display module 100 may be the present disclosed display module, or other appropriate display module. At the flat state and the bent state of the display device 200, the heat dissipation components located on the side edges of the display device may dissipate the heat of the flexible display panel. Thus, the heat dissipation effect of the display device may be improved.

It should be noted that, for the embodiments of the display device 200 provided in the present disclosure, reference may be made to the embodiments of the flexible display module 100 described above. The display device 200 provided by the present disclosure may be any product or component with realistic functions, such as a mobile phone, a tablet computer, a television, a monitor, a notebook computer, a digital photo frame, or a navigator, etc., and is especially suitable for display products or components with the foldable performance.

In summary, the flexible display module and display device provided by the present disclosure may achieve at least the following beneficial effects.

The flexible display module and the display device provided by the present disclosure may include a flexible display panel and a heat dissipation assembly. The heat dissipation assembly may include a fan assembly and a first air tube. The first air tube may be disposed on at least one side edge of the flexible display panel. When dissipating heat, the air flow provided by the fan assembly may be transmitted to the surface of the flexible display panel through the first air tube, and the heat dissipation of the surface of the flexible display panel may be achieved. The first air tube may be disposed on the at least one side edge of the flexible display panel to provide the airflow to the surface of the flexible display panel, the heat dissipation area and the heat dissipation efficiency of the flexible display panel may be increased. Accordingly, the heat accumulation causing the abnormal display of the flexible display panel in some parts of the display panel may be avoided. Thus, the display reliability of the flexible display module and the display device may be enhanced, and the user experience may be improved.

Although some specific embodiments of the present disclosure have been described in detail through examples, those skilled in the art should understand that the above examples are only for illustration and not for limiting the scope of the present disclosure. Those skilled in the art should understand that the above embodiments can be modified without departing from the scope and spirit of the present disclosure. The scope of the present disclosure may be defined by the appended claims.

What is claimed is:

1. A flexible display module, comprising:
   a flexible display panel; and
   a heat dissipation assembly,
   wherein:
   the heat dissipation assembly includes a fan assembly and a first air tube;
   the first air tube is disposed on at least one side edge of the flexible display panel; and
   the fan assembly provides an airflow to a surface of the flexible display panel through the first air tube.

2. The flexible display module according to claim 1, wherein the fan assembly comprises:
   a fan; and
   a main air outlet,
   wherein:
   the first air tube includes a plurality of sub-air outlets; and
   the airflow provided by the fan flows to the first air tube through the main air outlet and is transmitted to the flexible display panel through the plurality of sub-air outlets.

3. The flexible display module according to claim 2, further comprising:
   a fixing member,
   wherein:
   the fixing member is fixed on at least one side edge of the flexible display panel; and
   the first air tube is fixed on the display panel by the fixing member.

4. The flexible display module according to claim 3, wherein the fixing member comprises:
   a plurality of hinge units connected to each other,
   wherein:
   the plurality of hinge units form a host space; and
   the first air tube is disposed in the host space.

5. The flexible display module according to claim 4, wherein:
   the plurality of hinge units include an opening facing the flexible display panel; and
   the airflow flows to the surface of the flexible display panel through the opening after the airflow flows through the plurality of sub-air outlets;
   the opening includes a plurality of sub-openings; and
   the plurality of sub-openings and the plurality of sub-air outlets are disposed with a one-on-one correspondence.

6. The flexible display module according to claim 5, wherein:
   the plurality of sub-openings include a first sub-opening and a second sub-opening;
   a corresponding airflow path for the airflow being transmitted from the fan to the first sub-opening is greater than a corresponding airflow path for the airflow being transmitted from the fan to the second sub-opening; and
   an area of the first sub-opening is greater than an area of the second sub-opening.

7. The display module according to claim 5, wherein:
   area of each of the plurality of openings is equal.

8. The display module according to claim 5, wherein:
   the plurality of hinge units include a plurality of air ducts;
   one of plurality of air ducts connects one of the plurality of sub-air outlets and one of the plurality of sub-openings;
   the one of the plurality of sub-air outlet is configured as an air inlet of the one of the plurality of air ducts;
   the one of the plurality of sub-openings is configured as an air outlet of the one of the plurality of air ducts;
   each of the plurality of air ducts includes a first air duct and a second air duct having a through-connection with each other;
   an extension direction of the first air duct intersects an extension direction of the second air duct;
   along a direction perpendicular to the flexible display panel, the first air duct overlaps with the flexible display panel;
   the side edge of the flexible display panel includes two first side edges disposed oppositely and a second side edge adjacent to the two side edges respectively;

the plurality of the hinge units are fixed on the two first side edges; and the fan assembly is fixed on the second edge.

9. The display module according to claim 8, wherein:

the extension direction of the first air duct and the extension direction of the second side edge have a first angle;

the first angle is smaller than 90°; and along a flow direction of the airflow in the first air tube, the first angle corresponding to each first air duct is sequentially increased.

10. The display module according to claim 8, wherein:

the extension direction of each first air duct and the extension direction of each second side edge are parallel to each other.

11. The display panel according to claim 8, wherein:

each of the plurality of hinge units includes an upper hinge cover and a lower hinge cover disposed oppositely;

a side of the upper hinge cover facing the lower hinge cover includes a concave side surface; and a side of the lower hinge cover facing the upper hinge cover includes a convex side surface; and the concave side surface and the convex side surface encloses the one of the plurality of air ducts.

12. The display module according to claim 5, wherein:

the side edges of the flexible display panel include two first side edges disposed oppositely and a second side edge adjacent to the two first side edges respectively;

the plurality of hinge units are fixed on the two first side edges;

the fan assembly is fixed on the second side edge;

the plurality of hinge units include a plurality of first hinge units and a plurality of second hinge units; and the plurality of first hinge units and the plurality of second hinge units are disposed on the different first edges, respectively.

13. The display module according to claim 12, wherein:

sub-openings in the plurality of first hinge units and sub-openings in the plurality of second hinge units are symmetrically distributed at two sides of the flexible display panel, or along the extension direction of the first edge, sub-openings in the plurality of first hinge units and sub-openings in the plurality of second hinge units are disposed with staggered patterns, or sub-openings in the plurality of first hinge units include third sub-openings and fourth sub-openings distributed with staggered patterns along the extension direction of the side edge;

an area of a third sub-opening is greater than an area of a fourth sub-opening;

sub-openings in the plurality of second hinge units include fifth sub-openings and sixth sub-openings distributed with staggered patterns along the extension direction of the side edge;

an area of a fifth sub-opening is smaller than an area of a sixth sub-opening;

the third sub-openings and the fifth sub-openings are disposed with a one-on-one correspondence; and the fourth sub-openings and the sixth sub-openings are disposed with a one-on-one correspondence.

14. The display module according to claim 12, wherein the heat dissipation assembly further comprises:

a second air tube, wherein:

the second air tube is disposed on the second edge; and the fan assembly also provides an airflow to the flexible display panel through the second air tube.

15. The display module according to claim 4, wherein:

each of the plurality of hinge units includes an upper hinge cover and a lower hinge cover;

a first surface of the upper hinge cover includes a first concave portion;

a first surface of the lower hinge cover includes a second concave portion;

the first surface of the upper hinge cover and the first surface of the lower hinge cover are buckled oppositely; and the first concave portion and the second concave portion form a host space.

16. The display module according to claim 15, wherein:

a side of the lower hinge cover facing the flexible display panel includes a first clamping slot; and the side edges of the flexible display panel are disposed in the first clamping slot.

17. The display module according to claim 16, wherein:

a side of the upper hinge cover facing the lower hinge cover includes a first sub-surface and a second sub-surface;

a side of the lower hinge cover facing the upper hinge cover includes a third sub-surface and a fourth sub-surface;

the first sub-surface and the third sub-surface are disposed oppositely and form a first air duct;

the second sub-surface and the fourth sub-surface are disposed oppositely and form a second air duct;

the first air duct and the second air duct have a through-connection;

an air inlet of the second air duct faces the first air tube;

an air outlet of the first air duct faces the flexible display panel; and along a direction pointing from the upper hinge cover to the lower hinge cover, the first sub-surface, the third sub-surface and the first clamping slot overlap.

18. The display module according to claim 4, wherein:

two adjacent hinge units of the plurality of hinge units have a rotatable connection; and a rotation direction of the rotatable connection is same as a bending direction of the flexible display panel.

19. The display module according to claim 1, wherein:

the first air tube is a soft tube; and the display panel further incudes a metal protection portion disposed around the plurality of sub-airlets;

the metal protection portion disposed around edges of the plurality of sub-air outlets.

20. A display device, comprising:

a flexible display module, wherein the display module includes:

a flexible display panel; and a heat dissipation assembly, wherein:

the heat dissipation assembly includes a fan assembly and a first air tube;

the first air tube is disposed on at least one side edge of the flexible display panel; and the fan assembly provides an airflow to a surface of the flexible display panel through the first air tube.

* * * * *